US012454849B2

(12) United States Patent
Ma et al.

(10) Patent No.: US 12,454,849 B2
(45) Date of Patent: Oct. 28, 2025

(54) DRAWER LOCK ASSEMBLIES

(71) Applicant: Innovation Lock, LLC, Palm Beach Gardens, FL (US)

(72) Inventors: Alvin Ma, Irvine, CA (US); William H. Bullwinkel, Farmingdale, NY (US); David R. Wachsman, Palm Beach Gardens, FL (US)

(73) Assignee: Innovation Lock, LLC, Palm Beach Gardens, FL (US)

( * ) Notice: Subject to any disclaimer, the term of this patent is extended or adjusted under 35 U.S.C. 154(b) by 207 days.

(21) Appl. No.: 18/221,424

(22) Filed: Jul. 13, 2023

(65) Prior Publication Data

US 2024/0035312 A1 Feb. 1, 2024

Related U.S. Application Data

(60) Provisional application No. 63/392,197, filed on Jul. 26, 2022.

(51) Int. Cl.
*E05B 65/46* (2017.01)
*E05B 55/00* (2006.01)

(52) U.S. Cl.
CPC ............ *E05B 65/46* (2013.01); *E05B 55/005* (2013.01)

(58) Field of Classification Search
CPC ........ E05B 55/00; E05B 55/005; E05B 65/00; E05B 65/46; E05B 65/461; E05B 65/462; E05B 65/463

(Continued)

(56) References Cited

U.S. PATENT DOCUMENTS 100,738 A 3/1870 Dwight
884,260 A 4/1908 Boyd
(Continued)

FOREIGN PATENT DOCUMENTS

CA 3128714 A1 2/2022
DE 3233976 C1 8/1983
WO 8300353 A1 2/1983

OTHER PUBLICATIONS

U.S. Appl. No. 17/558,768, filed Dec. 22, 2021, William H. Bullwinkel.
(Continued)

*Primary Examiner* — Nathan Cumar
(74) *Attorney, Agent, or Firm* — Michael J Porco; Gerald E Hespos

(57) ABSTRACT

A drawer lock assembly includes a housing; a barrel having a first end extending perpendicularly from a front face of the housing and a second end extending through a rear face of the housing; a locking actuation member disposed through the barrel; a driver disposed through the barrel to engage the locking actuation member; a first and second bolt, each bolt configured to engage the driver, where upon actuation of the driver via the locking actuation member, the first and second bolts move in opposite directions in a perpendicular arrangement relative to the barrel; and an end plate configured to retain the driver and the first and second bolts in the housing, wherein upon actuation of the locking actuation member by a key, the first and second bolts extend from the housing in a first position and at least partially retract within the housing in a second position.

17 Claims, 22 Drawing Sheets

(58) Field of Classification Search
USPC .............................................................. 70/85
See application file for complete search history.

(56) References Cited

U.S. PATENT DOCUMENTS 1,342,728 A 6/1920 Welch
1,539,301 A 5/1925 Cooper
1,864,883 A 6/1932 Edward
1,938,112 A 12/1933 Schlage
1,965,336 A 7/1934 Fitz
2,032,821 A * 3/1936 Waits ....................... B62H 5/06 70/185
2,140,066 A * 12/1938 White ................... E05C 19/182 292/296
2,275,362 A * 3/1942 Golden ............... E05B 63/0017 70/134
2,720,102 A * 10/1955 Spain .................... E05C 19/182 70/95
2,793,520 A * 5/1957 Candia .................. E05B 63/128 70/150
2,938,373 A * 5/1960 Gray ....................... E05B 9/084 70/370
3,262,292 A 7/1966 Glass
3,340,709 A 9/1967 Callahan
3,345,838 A 10/1967 Russell et al.
3,423,968 A 1/1969 Foote
3,503,233 A 3/1970 Russell et al.
3,563,593 A 2/1971 Leier et al.
3,589,152 A 6/1971 Glass et al.
3,696,647 A 10/1972 Balicki
3,726,115 A * 4/1973 Wellekens .............. E05B 67/26 70/33
3,792,885 A * 2/1974 Giardina ............... E05B 13/005 292/259 R
3,844,592 A * 10/1974 Giardina ................. E05C 9/048 292/150
3,863,475 A * 2/1975 Foss ..................... G07G 1/0027 70/451
3,919,866 A * 11/1975 Lipschutz ............... E05B 17/04 70/81
3,933,015 A * 1/1976 Balicki ................. E05B 67/003 70/49
4,003,227 A * 1/1977 Casey ................... E05B 13/002 70/14
4,009,599 A * 3/1977 Patriquin ............ E05B 65/0864 70/371
4,012,928 A * 3/1977 Dauenbaugh ........... E05B 9/084 292/147
4,067,599 A * 1/1978 Ohno ........................ E05B 3/06 292/357
4,356,580 A * 11/1982 Kurtz .................. E05B 65/0894 70/95
4,418,554 A * 12/1983 Wolfgang ........... E05B 29/0026 70/360
4,476,699 A * 10/1984 Dahlborg ................ E05B 67/36 70/57
4,565,080 A * 1/1986 Kincaid ................ E05B 13/105 70/370
4,617,810 A 10/1986 Fish et al.
4,630,457 A 12/1986 Kincaid et al.
4,672,827 A 6/1987 Craig
4,708,006 A * 11/1987 Hodgson ................. E05B 37/08 70/311
4,756,638 A * 7/1988 Neyret .................... E05B 9/084 70/451
4,768,360 A * 9/1988 Foshee ................ E05B 65/0864 70/369
4,793,163 A * 12/1988 MacFarlane ............ E05C 19/08 292/281
4,809,525 A * 3/1989 Cox ........................ E05B 9/086 70/369
4,899,563 A * 2/1990 Martin .................... E05B 9/084 70/451
4,899,563 B1 3/1990 Martin
4,920,774 A 5/1990 Martin
5,010,753 A * 4/1991 Boris, Jr. ................ E05B 9/086 70/369
5,038,589 A * 8/1991 Martin .................... E05B 9/084 70/375
5,101,649 A * 4/1992 Duval ..................... E05B 9/086 70/369
5,113,676 A * 5/1992 Panossian ............. E05B 15/102 70/462
5,121,619 A * 6/1992 Martin .................... E05B 9/084 70/369
5,127,244 A 7/1992 Myers
D337,041 S * 7/1993 Carl ............................... D8/331
5,251,467 A 10/1993 Anderson
5,255,544 A * 10/1993 Wu ..................... B60R 25/0225 70/226
5,315,850 A * 5/1994 Edeus ....................... E05C 1/04 70/369
5,345,794 A * 9/1994 Jenks ...................... E05B 67/36 70/32
5,492,206 A * 2/1996 Shieh ...................... E05B 67/36 70/33
5,499,518 A * 3/1996 Shieh ...................... E05B 67/36 188/69
5,548,981 A * 8/1996 Kirk .................... E05B 17/0062 292/331
5,590,555 A * 1/1997 Kester ................. E05B 17/2084 292/357
5,615,566 A * 4/1997 Brandt ................ E05B 27/0032 70/419
5,657,652 A * 8/1997 Martin .................... E05B 65/46 70/81
5,678,438 A * 10/1997 Kolkman ................ E05B 9/084 70/370
5,722,275 A 3/1998 Price et al.
5,737,950 A 4/1998 Yun-Bin
5,813,260 A * 9/1998 Widen .................... E05B 9/086 70/369
5,819,889 A * 10/1998 Shieh ...................... E05B 67/36 70/34
5,873,272 A * 2/1999 Thompson .............. E05B 9/084 70/451
D408,711 S * 4/1999 Bianco ........................... D8/331
5,913,907 A * 6/1999 Lee ..................... E05B 73/0005 70/57
5,970,760 A * 10/1999 Shen ....................... E05B 9/084 70/369
6,035,673 A * 3/2000 Harrison ................. E05B 9/084 70/369
6,079,241 A * 6/2000 Burleigh ................. E05B 15/02 70/451
6,092,402 A * 7/2000 Porcelli ................ A63C 11/005 70/58
6,161,404 A * 12/2000 Westwinkel ............ E05B 9/084 70/370
6,393,882 B1 * 5/2002 Higgins .................. E05B 85/02 70/451
6,523,379 B2 * 2/2003 Teskey .................... E05B 9/084 70/451
6,533,336 B2 * 3/2003 Kemp ..................... E05B 3/003 292/348
6,606,890 B1 * 8/2003 Widen ...................... E05B 9/04 70/369
6,708,539 B1 * 3/2004 Widen ...................... E05B 9/04 70/369
6,920,770 B2 7/2005 Lurie et al.
6,952,940 B2 * 10/2005 Molzer ................. E05B 13/002 70/210
D525,110 S * 7/2006 Beard ............................ D8/383
RE39,364 E * 10/2006 Brandt ................ E05B 27/0032 70/419
7,178,372 B1 * 2/2007 Shen ..................... E05B 55/005 70/216
7,308,809 B2 * 12/2007 Lu ........................... G06F 1/182 70/57

(56) References Cited

U.S. PATENT DOCUMENTS 7,340,928 B2 * 3/2008 Hoffman ................. E05B 9/084 70/451
RE41,188 E 4/2010 Lurie et al.
7,695,031 B2 * 4/2010 Jackson, Jr. .............. E05C 5/00 292/65
7,716,958 B2 * 5/2010 Martin .................... E05C 3/042 70/370
7,836,735 B2 11/2010 Liu
7,849,720 B2 * 12/2010 Reese ................... E05B 21/066 70/360
7,874,189 B2 * 1/2011 Martin .................... E05B 65/44 70/451
7,895,867 B2 * 3/2011 Hsieh ...................... E05B 17/04 70/379 R
7,918,111 B2 * 4/2011 Uliano .................... E05B 67/36 70/2
8,028,555 B2 * 10/2011 Lurie ...................... E05C 3/042 70/DIG. 62
D651,889 S * 1/2012 Mahaffey ....................... D8/343
D667,286 S * 9/2012 Wu ................................ D8/343
D670,993 S * 11/2012 Lin ................................ D8/343
8,444,100 B2 * 5/2013 Takahashi ........... F16B 19/1081 248/220.21
8,601,839 B1 * 12/2013 Liu ......................... E05B 55/12 70/151 R
8,646,297 B2 2/2014 Foti
8,776,557 B2 * 7/2014 Wang ...................... E05B 67/36 70/371
8,833,118 B1 * 9/2014 McLane .................... E05C 1/08 292/DIG. 60
8,842,422 B2 * 9/2014 Hung .................. E05B 73/0005 361/679.01
8,905,693 B2 * 12/2014 Coffland ................. F16B 43/00 411/525
8,919,156 B1 * 12/2014 Liu ......................... E05B 17/04 70/32
8,978,426 B2 * 3/2015 Wang ...................... E05B 67/36 70/371
D733,520 S * 7/2015 Barna ............................ D8/343
9,167,918 B2 * 10/2015 Leyden ................. A47F 5/0876
9,234,369 B2 * 1/2016 Gupta ................... F24C 15/022
9,267,310 B2 * 2/2016 Linnåsen .................. E05B 3/00
9,435,144 B2 * 9/2016 Bullwinkel ............. E05B 67/36
9,524,626 B2 * 12/2016 Brühwiler .............. G08B 13/00
9,593,509 B2 * 3/2017 Murray ............... E05B 65/0014
D789,770 S * 6/2017 Reeb .............................. D8/343
9,816,289 B2 11/2017 Bullwinkel
D804,283 S * 12/2017 Jasper ............................ D8/343
10,087,653 B2 10/2018 Bullwinkel
10,156,088 B2 12/2018 Bullwinkel et al.
10,184,270 B2 1/2019 Bullwinkel
D840,212 S * 2/2019 Huang ........................... D8/331
10,196,843 B2 * 2/2019 Hickman .................. E05C 1/02
10,208,510 B1 * 2/2019 Van Dyck ................. E05C 1/10
10,435,914 B2 10/2019 Ma
10,662,672 B2 5/2020 Bullwinkel
10,697,203 B1 * 6/2020 Gokcebay .......... G07C 9/00309
10,724,276 B2 7/2020 Ma et al.
D899,218 S * 10/2020 Bullwinkel .................... D8/331
10,858,863 B2 * 12/2020 Johnston ............... E05B 47/026
11,124,988 B1 * 9/2021 Hanson ................... E05B 65/46
11,603,680 B2 * 3/2023 Ma ...................... E05B 65/0025
D988,835 S 6/2023 Bullwinkel et al.
11,976,497 B2 5/2024 Bullwinkel et al.
2001/0045114 A1 11/2001 Sokurenko
2003/0019258 A1 1/2003 Irgens et al.
2005/0011237 A1 1/2005 Lurie et al.
2005/0011239 A1 1/2005 Lurie et al.
2005/0241348 A1 11/2005 Devecki
2005/0271494 A1 12/2005 Hidalgo et al.
2005/0279894 A1 12/2005 Sedon et al.
2006/0086162 A1 4/2006 Huang
2006/0157431 A1 7/2006 Nagelski et al.
2007/0175246 A1 8/2007 Hsai
2007/0227209 A1 * 10/2007 Massard ................... E05B 9/04 70/371
2009/0071209 A1 * 3/2009 Lurie ...................... E05B 17/04 70/391
2009/0267358 A1 * 10/2009 Bourgain ............ E05B 17/2053 292/160
2010/0031717 A1 * 2/2010 Lurie ...................... E05B 9/084 70/385
2010/0148524 A1 * 6/2010 Czerwinski, Jr. ....... E05B 15/02 292/299
2010/0170309 A1 * 7/2010 Liu ......................... E05B 65/46 70/86
2010/0212371 A1 * 8/2010 Foti .......................... B62H 5/18 70/57.1
2011/0127795 A1 6/2011 Still et al.
2011/0132047 A1 6/2011 Terhaar et al.
2011/0316325 A1 12/2011 Martin, III et al.
2013/0105419 A1 5/2013 Kologe
2014/0013813 A1 1/2014 Le
2014/0037399 A1 2/2014 Hyatt
2014/0298869 A1 10/2014 Wang
2015/0176307 A1 6/2015 Bullwinkel
2016/0281393 A1 9/2016 Bullwinkel et al.
2017/0298651 A1 10/2017 Ma
2017/0350163 A1 12/2017 Ma et al.
2018/0038132 A1 2/2018 Bullwinkel
2019/0145126 A1 5/2019 Wolfish et al.
2021/0246935 A1 8/2021 Grewell et al.
2022/0034126 A1 * 2/2022 Zhao ....................... E05B 63/08
2022/0213719 A1 * 7/2022 Bullwinkel ............. E05B 9/086
2022/0356734 A1 * 11/2022 Bullwinkel ......... E05B 65/0894
2024/0035312 A1 * 2/2024 Ma .......................... E05C 9/041

OTHER PUBLICATIONS

U.S. Appl. No. 29/673,492, filed Dec. 14, 2018, William H. Bullwinkel.
U.S. Appl. No. 29/782,823, filed May 10, 2021, William H. Bullwinkel.
Compx Timberline, Locks & File Frame for wood furniture & cabinets, Catalog #0816, Copyright 2016, pp. 1-36.
Desk Lock + Door Puncher, posted May 6, 2019 [online], [retrieved Nov. 14, 2022]. Retrieved from internet, https://www.amazon.com/dp/B07RDJSS6W (Year: 2019).
Double Door Lock, posted Apr. 18, 2022 [online], [retrieved Nov. 14, 2022]. Retrieved from internet, https://www.amazon.com/Cabinet-Deadbolt-Door-Installation-Drilling-Diameter/dplB09Y51 MHVK (Year: 2022).
Gear Lock DL37, Data Sheet, Kenstan Lock Company, Feb. 2020, one (1) page.
Olympus Ratchet Lock, posted Dec. 13, 2008 [online], [retrieved Feb. 27, 2023]. Retrieved from internet, https://www.arnazon.com/Olympus-Sliding-Ratchet-Keyed-Different/dp/B005WL056Q (Year: 2008).
Rollok Rolling Doors & Security Shutters, Product Catalog, access at https://cdn.thomasnet.com/ccp/30841252/258644.pdf; Nov. 11, 2017; pp. 1-16.

* cited by examiner

Locked

Locked

Open

Open

Locked

Open

Open

Locked

DRAWER LOCK ASSEMBLIES

PRIORITY

This application claims priority to U.S. Provisional Patent Application Ser. No. 63/392,197, filed Jul. 26, 2022, the contents of which are hereby incorporated by reference in its entirety.

TECHNICAL FIELD

The present disclosure relates generally to lock mechanisms, and more particularly, to drawer lock assemblies for use with cabinet drawers, desk drawers and the like.

BACKGROUND

Numerous types of core cylinders for locks are known and popularly used for various applications. In one application, a lock is provided to secure a drawer of a cabinet, desk or similar structure. In such application, a lock assembly is mounted through a hole or aperture of a drawer, and thus moves with the drawer when opened or closed. When the drawer is in a closed position, a bolt or latch projects from the lock assembly into an aperture, recess or other portion of the structure to secure the drawer in the closed position. To open the drawer, an appropriate key is inserted into the core cylinder and rotated to withdraw the bolt or latch into the lock assembly and from the portion of the structure, enabling the drawer to be opened.

SUMMARY

Drawer lock assemblies for use with cabinet drawers, desk drawers and the like are provided.

According to one aspect of the present disclosure, a drawer lock assembly includes a housing having a front face and a rear face separated by a predetermined width; a barrel having a first end extending perpendicularly from the front face of the housing and a second end extending through the rear face of the housing; a locking actuation member disposed through the first end of the barrel; a driver disposed through the second end of the barrel to engage the locking actuation member; a first and second bolt, each bolt configured to engage the driver, where upon actuation of the driver via the locking actuation member, the first and second bolts move in opposite directions of each other in a perpendicular arrangement relative to the barrel; and an end plate configured to retain the driver and the first and second bolts in the housing, wherein upon actuation of the locking actuation member by a key, the first and second bolts extend from the housing in a first position and at least partially retract within the housing in a second position.

In one aspect, the drawer lock assembly further includes a first extension member coupled to the first bolt and a second extension member coupled to the second bolt.

In another aspect, the drawer lock assembly further includes a first guide member that slidingly receives a free end of the first extension member and a second guide member that slidingly receives a free end of the second extension member.

In one aspect, each guide member includes a receiving member that slidingly receives the free end of the respective extension member, each guide member further includes a repositionable spacer disposed in the receiving member to compensate for a position of the respective extension member.

In another aspect, each of the first and second bolts include a plurality of gear teeth and a round cog gear is coupled to the driver to actuate the first and second bolts.

In a further aspect, each bolt is generally rectangular and includes a first surface and a second surface, the first bolt further includes a first plurality of gear teeth formed parallel to the first surface along a first edge and the second bolt includes a second plurality of gear teeth formed parallel to the first surface along an edge opposite the first edge of the first bolt.

In yet another aspect, the first and second bolts are arranged in the housing in a parallel relationship such that the first plurality of gear teeth are spaced a predetermined distance away from the second plurality of gear teeth, and further comprising a round cog gear disposed between the first and second bolt and configured to engage the first and second plurality of gear teeth.

In still another aspect, each of the first and second bolts include an elongated slot positioned adjacent the respective plurality of gear teeth and the driver includes a cam that extends through the elongated slots and an aperture in the gear, wherein upon actuation of the driver, the cam rotates the gear to extend and/or retract the first and second bolts.

In one aspect, each of the first and second bolts include a recess configured to receive an extension member.

In another aspect, the end plate includes an aperture that receives the cam of the driver.

In a further aspect, the rear face of the housing includes a recess configured to receive the first and second bolts such that the first and second bolts extend from the housing in the first position and at least partially retract within the housing in the second position.

In yet another aspect, wherein the second end of the barrel includes an extension member configured in a predetermined shape and the front face of the housing includes an aperture configured in a complementary shape to receive the extension member of the barrel.

In another aspect, the driver includes a circular plate including a first surface and a second surface, the first surface includes first and second prongs that engage the locking actuation member and the second surface includes the cam.

In one aspect, the barrel is at least one of a cylindrical barrel, an oval barrel, a faceted barrel and/or a rectangular barrel.

In another aspect, the housing is at least one of a rectangular housing and a faceted housing.

In a further aspect, the locking actuation member is at least one of a small format interchangeable core, a key removable core, a large format interchangeable core, a full-size interchangeable core and/or a fixed cylinder.

BRIEF DESCRIPTION OF THE DRAWINGS

The above and other aspects, features, and advantages of the present disclosure will become more apparent in light of the following detailed description when taken in conjunction with the accompanying drawings in which.

Figure 17:
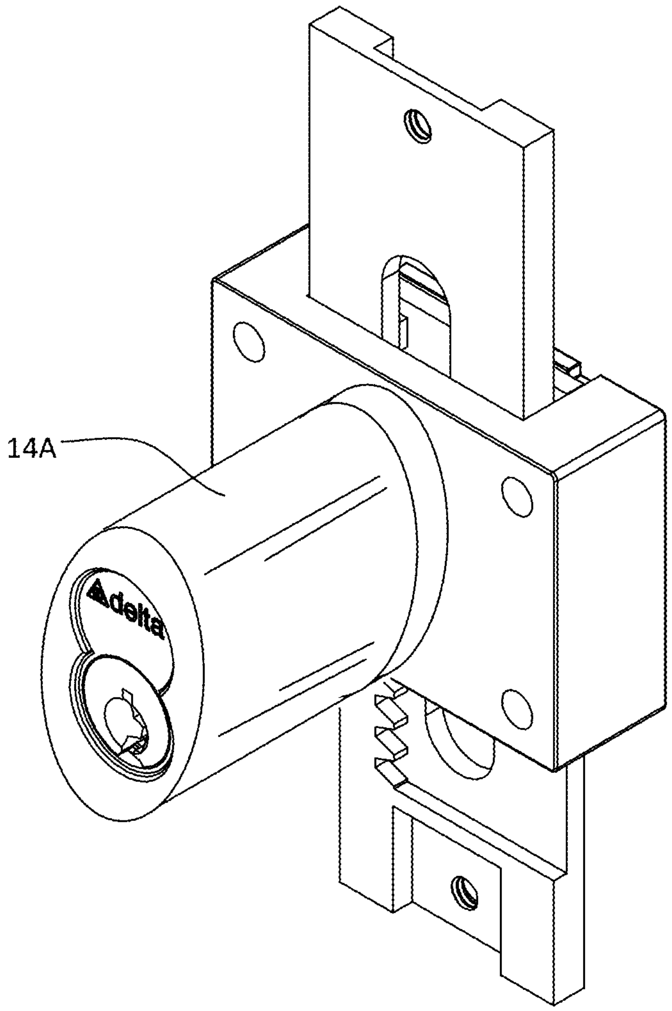
Figure 18:
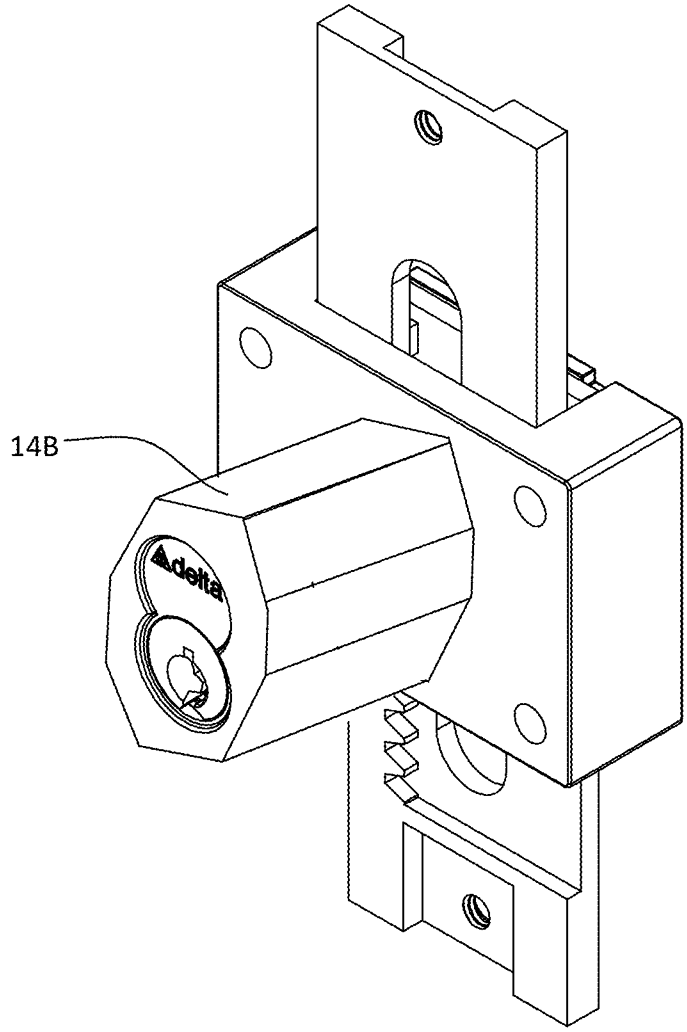
Figure 19:
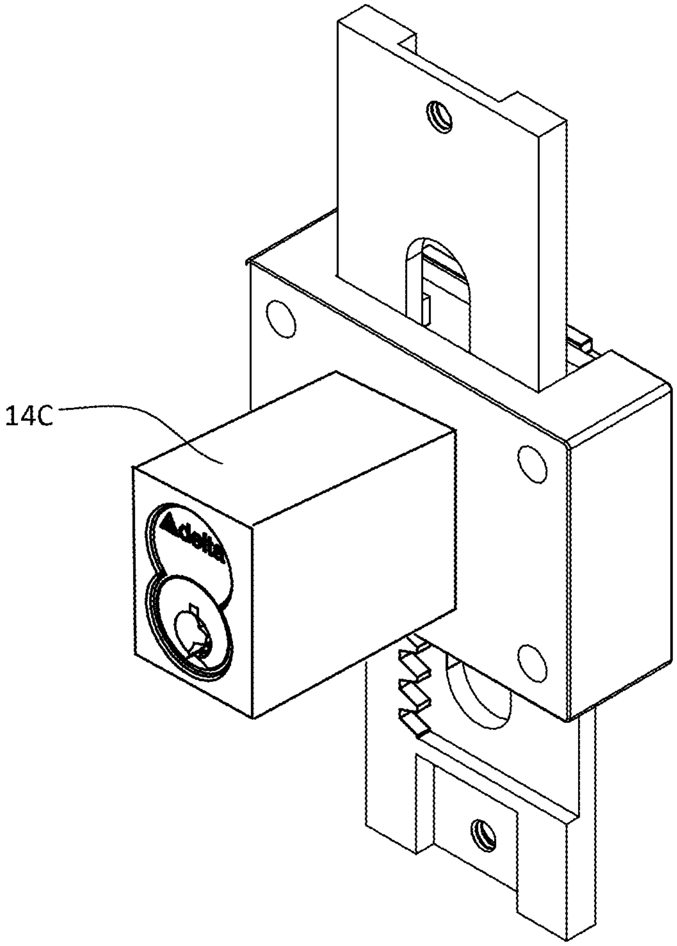
Figure 20:
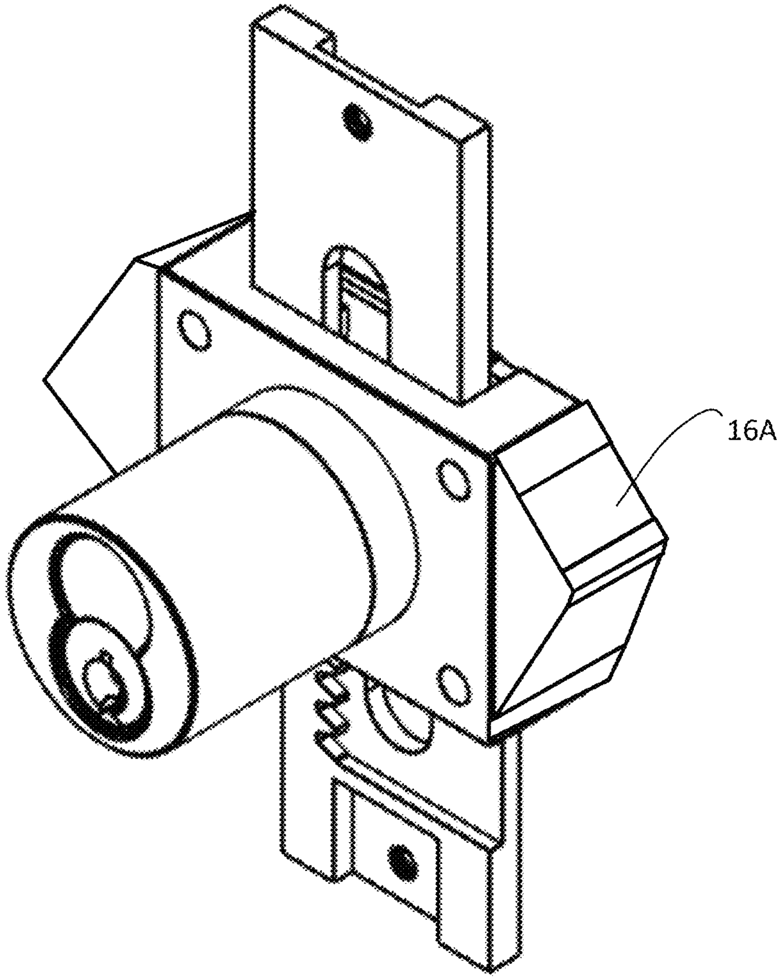

16D is a cross-sectional view of a structure including a drawer lock assembly with the drawer lock assembly in an open or retracted position in accordance with an embodiment of the present disclosure;

FIG. 17 is a front, perspective view of a drawer lock having an oval barrel in accordance with another embodiment of the present disclosure;

FIG. 18 is a front, perspective view of a drawer lock having a faceted barrel in accordance with another embodiment of the present disclosure;

FIG. 19 is a front, perspective view of a drawer lock having a rectangular barrel in accordance with another embodiment of the present disclosure; and FIG. 20 is a front, perspective view of a drawer lock having a faceted housing in accordance with another embodiment of the present disclosure.

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Figure 1:
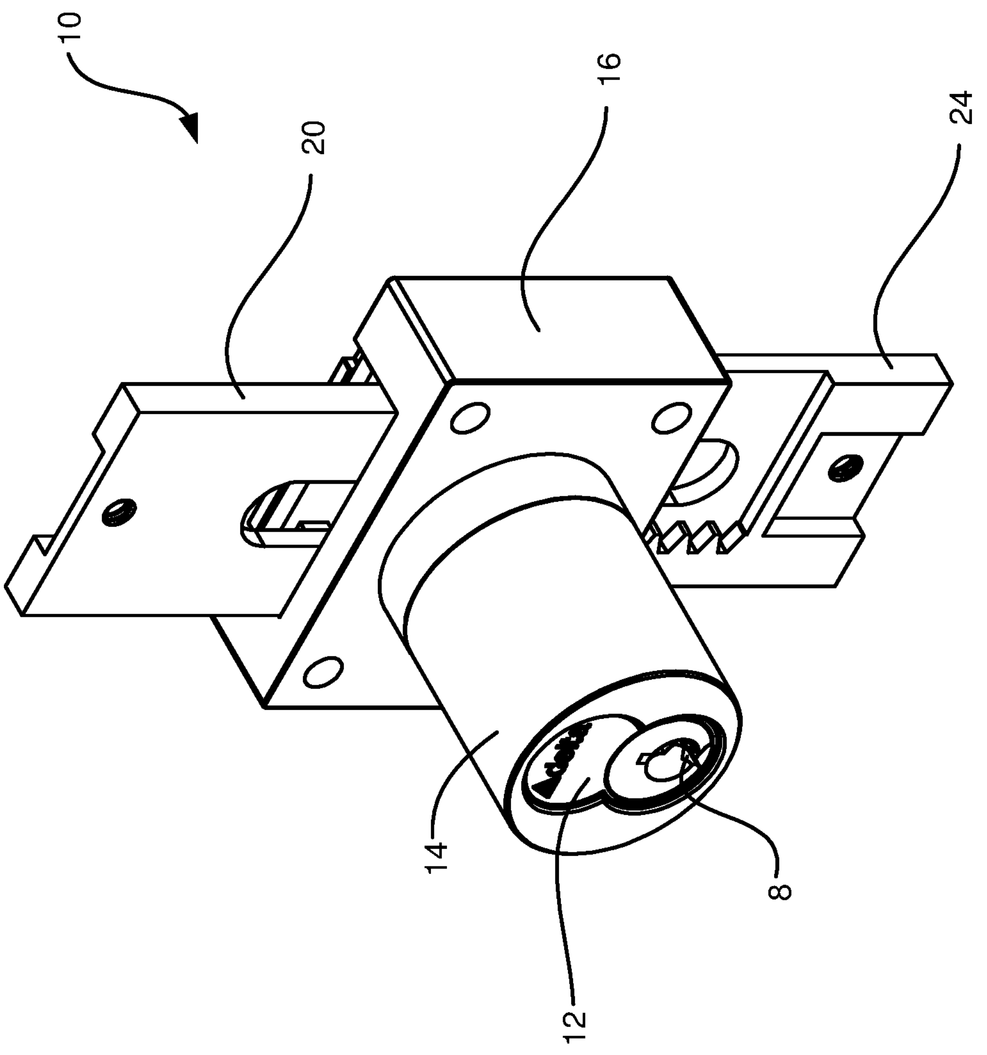
FIG. 1 is a front, perspective view of a drawer lock in accordance with an embodiment of the present disclosure.
Figure 2B:
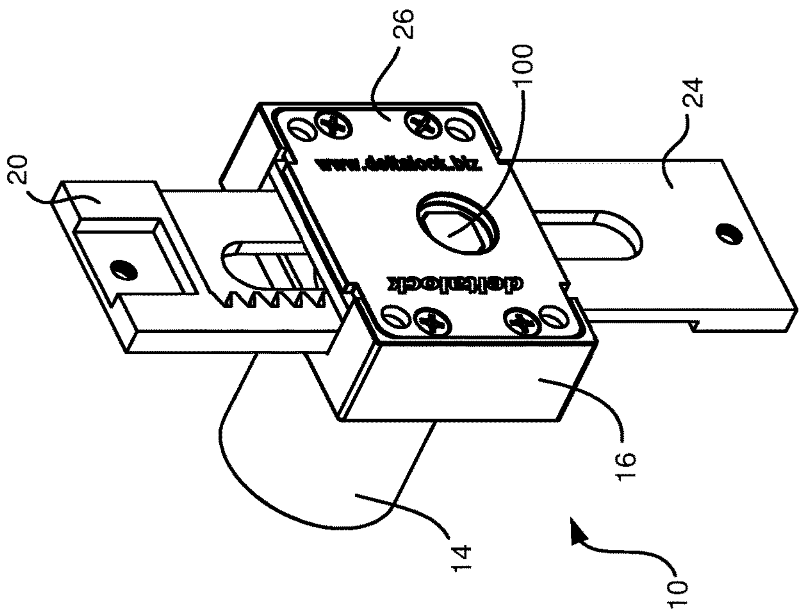
FIG. 2B is a rear, perspective view of a drawer lock in a locked position in accordance with an embodiment of the present disclosure.
Figure 2A:
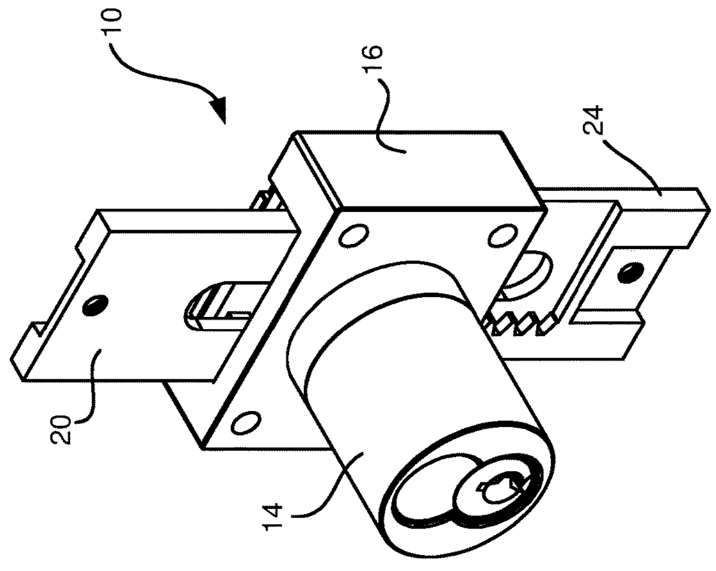
FIG. 2A is a front, perspective view of a drawer lock in a locked position
Figure 2D:
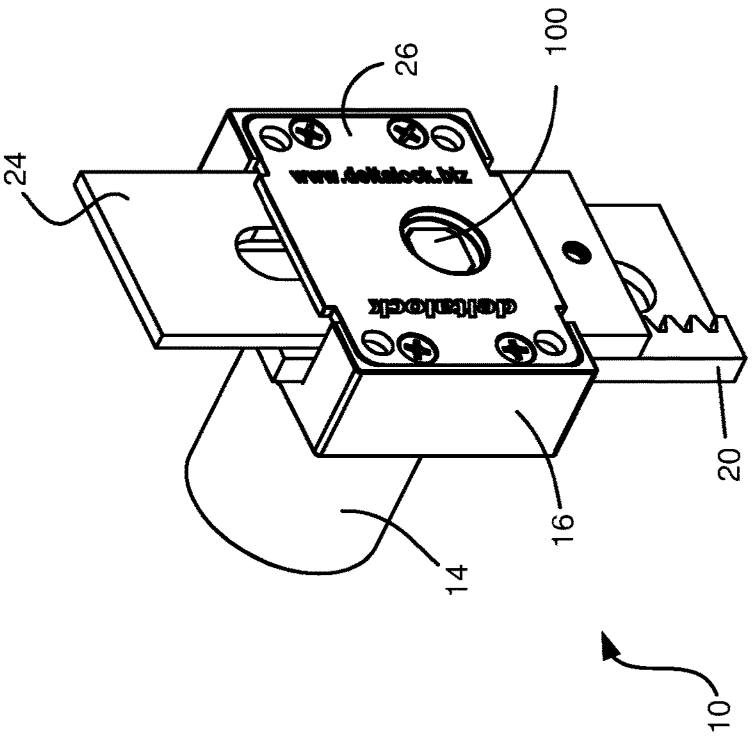
FIG. 2D is a rear, perspective view of a drawer lock in an open position in accordance with an embodiment of the present disclosure.
Figure 2C:
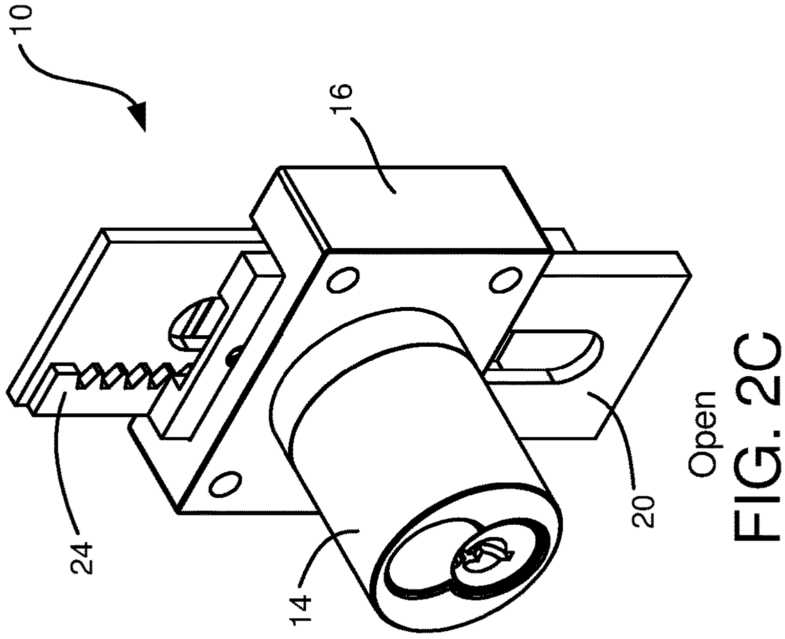
FIG. 2C is a front, perspective view of a drawer lock in an open position

Referring to FIG. 1, a drawer lock 10 is provided, where FIG. 2A is a front, perspective view of the drawer lock 10 in a locked (or extended) position, FIG. 2B is a rear, perspective view of the drawer lock 10 in a locked (or extended) position, FIG. 2C is a front, perspective view of the drawer lock 10 in an open (or retracted) position, and FIG. 2D is a rear, perspective view of the drawer lock 10 in an open (or retracted) position.

Figure 3:
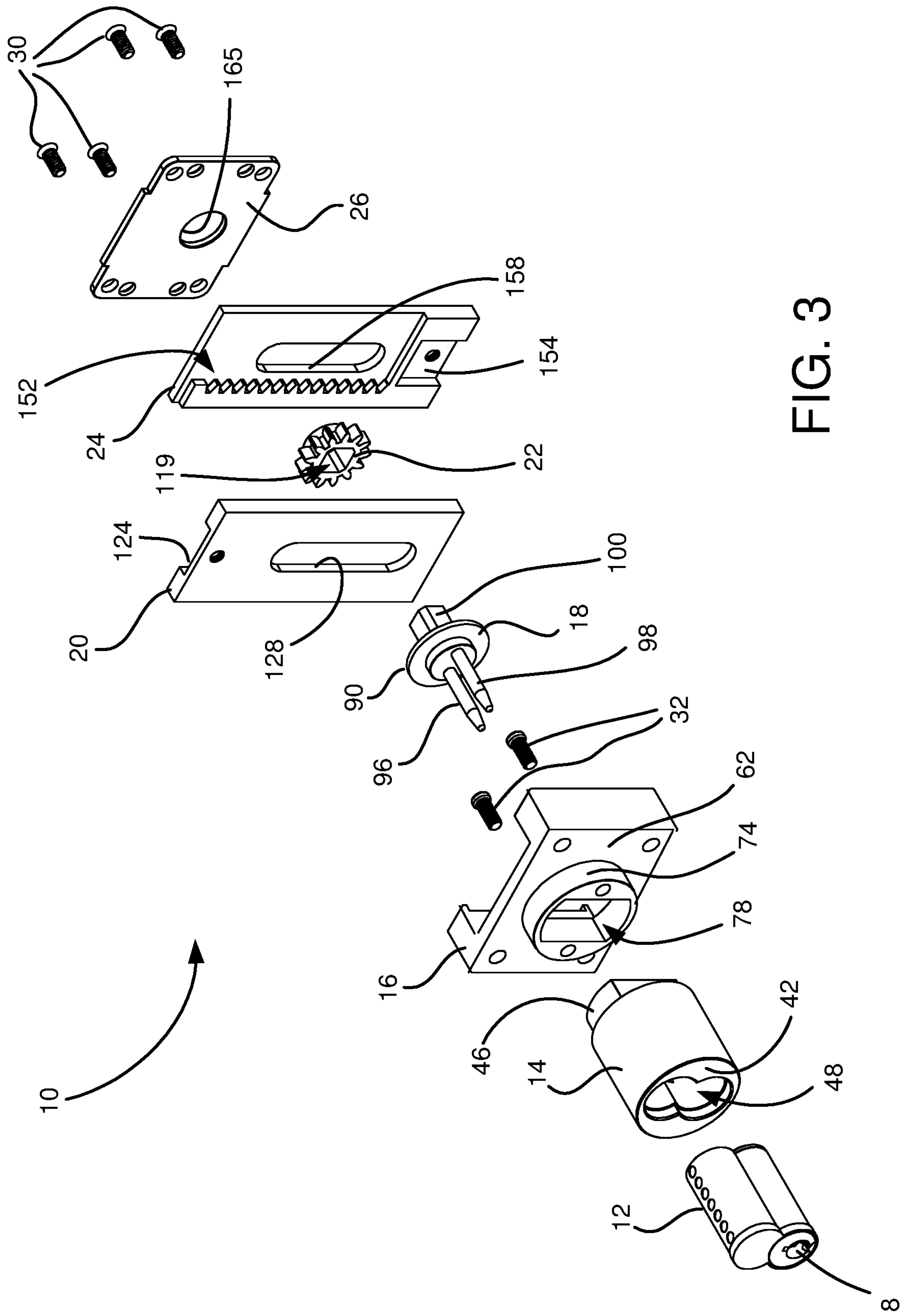
FIG. 3 is a front, perspective exploded view of a drawer lock in accordance with an embodiment of the present disclosure.
Figure 4:
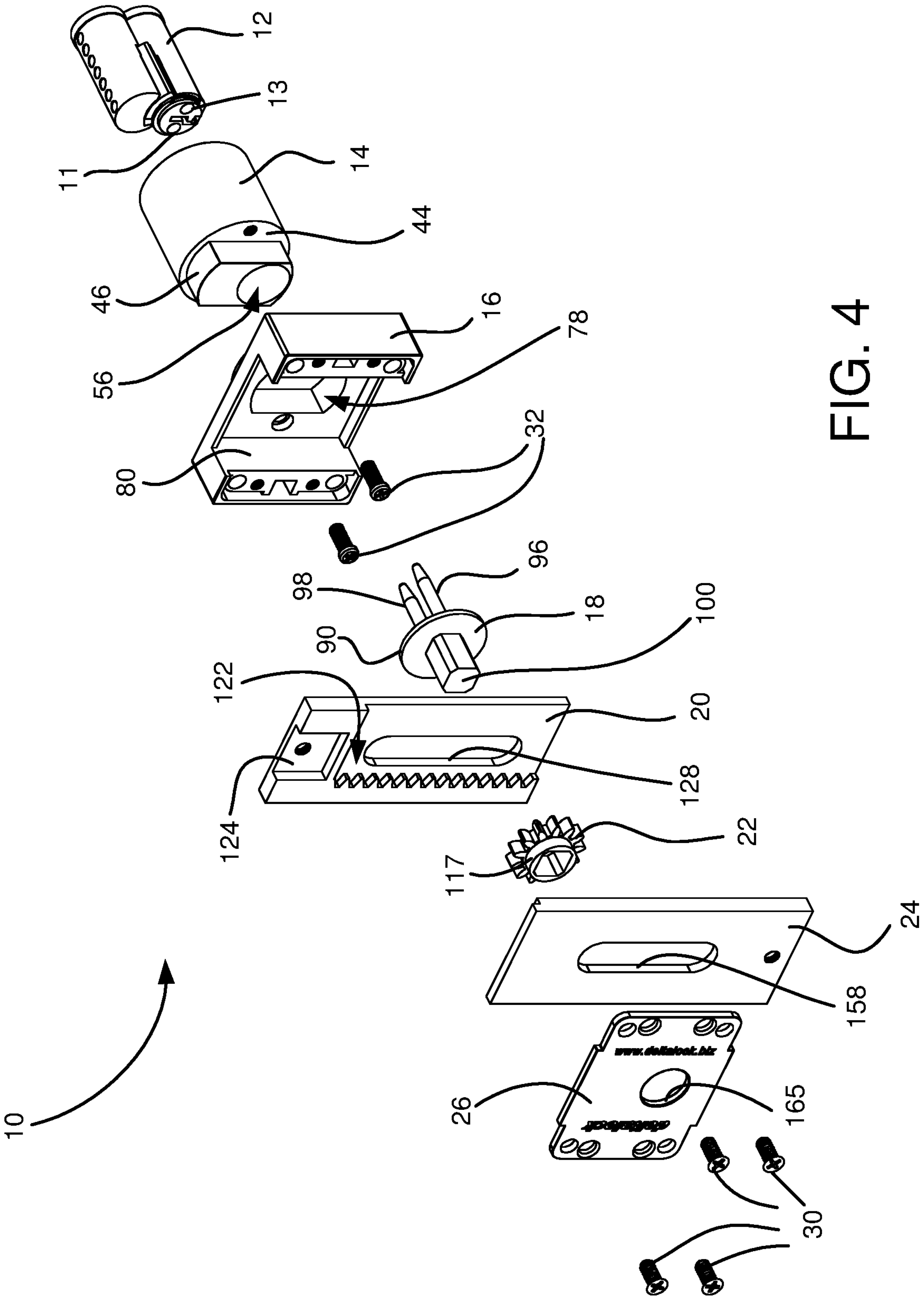
FIG. 4 is a rear, perspective exploded view of a drawer lock in accordance with an embodiment of the present disclosure.
Figure 5:
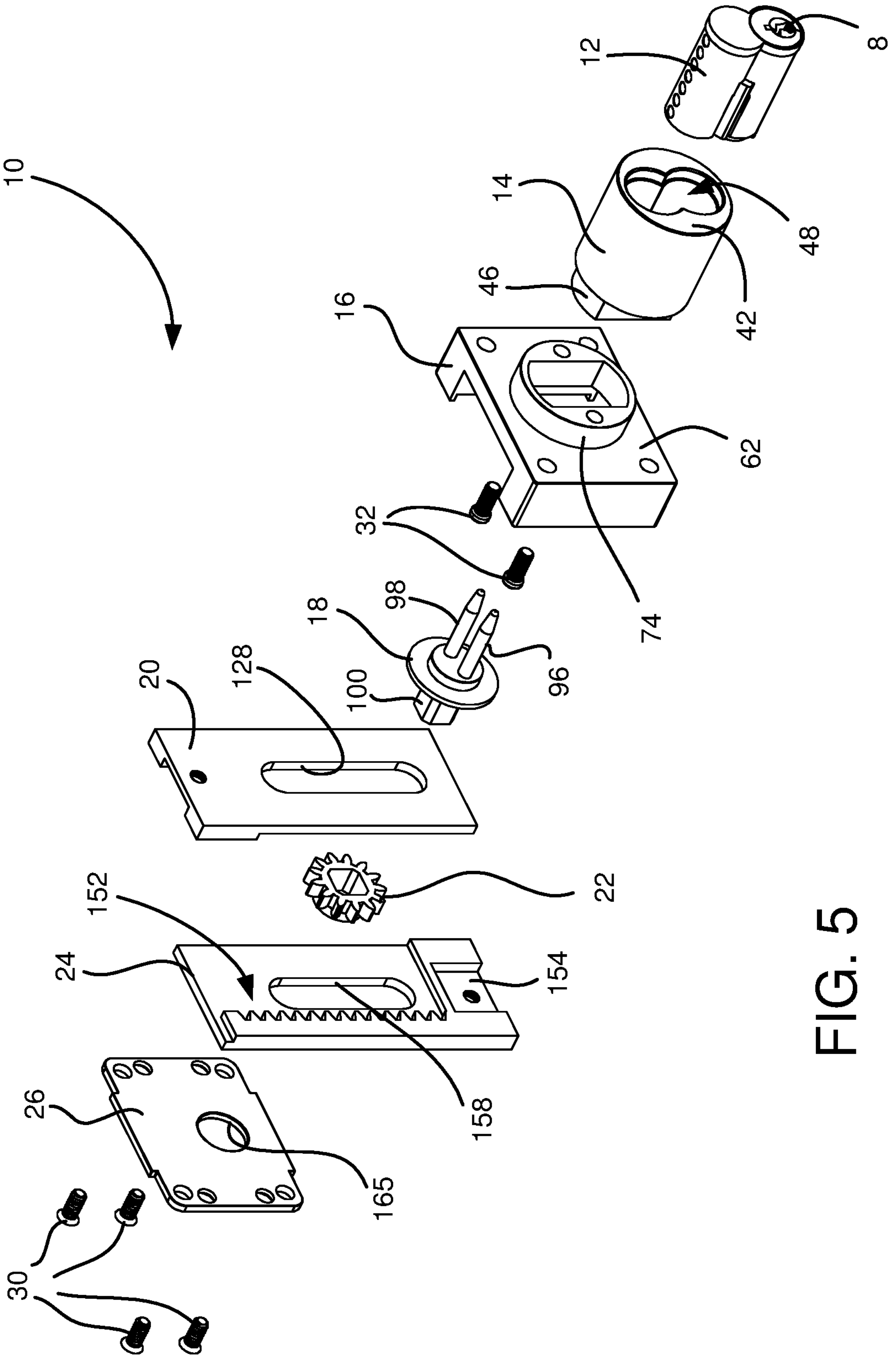
FIG. 5 is another front, perspective exploded view of a drawer lock in accordance with an embodiment of the present disclosure.

FIG. 3 is a front, perspective exploded view of the drawer lock 10, FIG. 4 is a rear, perspective exploded view of the drawer lock 10 and FIG. 5 is another front, perspective exploded view of the drawer lock 10 in accordance with an embodiment of the present disclosure.

The drawer lock 10 includes a core 12, a barrel 14, housing 16, a driver 18, top bolt 20, gear 22, bottom bolt 24, an end plate 26 and screws 30. It is to be appreciated that when the drawer lock 10 is referred to as being in a "locked" position the top bolt 20 and bottom bolt 24 are extended from the housing 16 to engage a recess of a structure to be locked; when the drawer lock 10 is referred to as being in an "opened" position the top bolt 20 and bottom bolt 24 are at least partially retracted into the housing 16 to withdraw respective ends of the bolts 20, 24 from the recess of a structure to, for example, open an associated drawer of the structure.

Figures 6A, 6B, 6C, 6D, 6E, 6F, 6G:
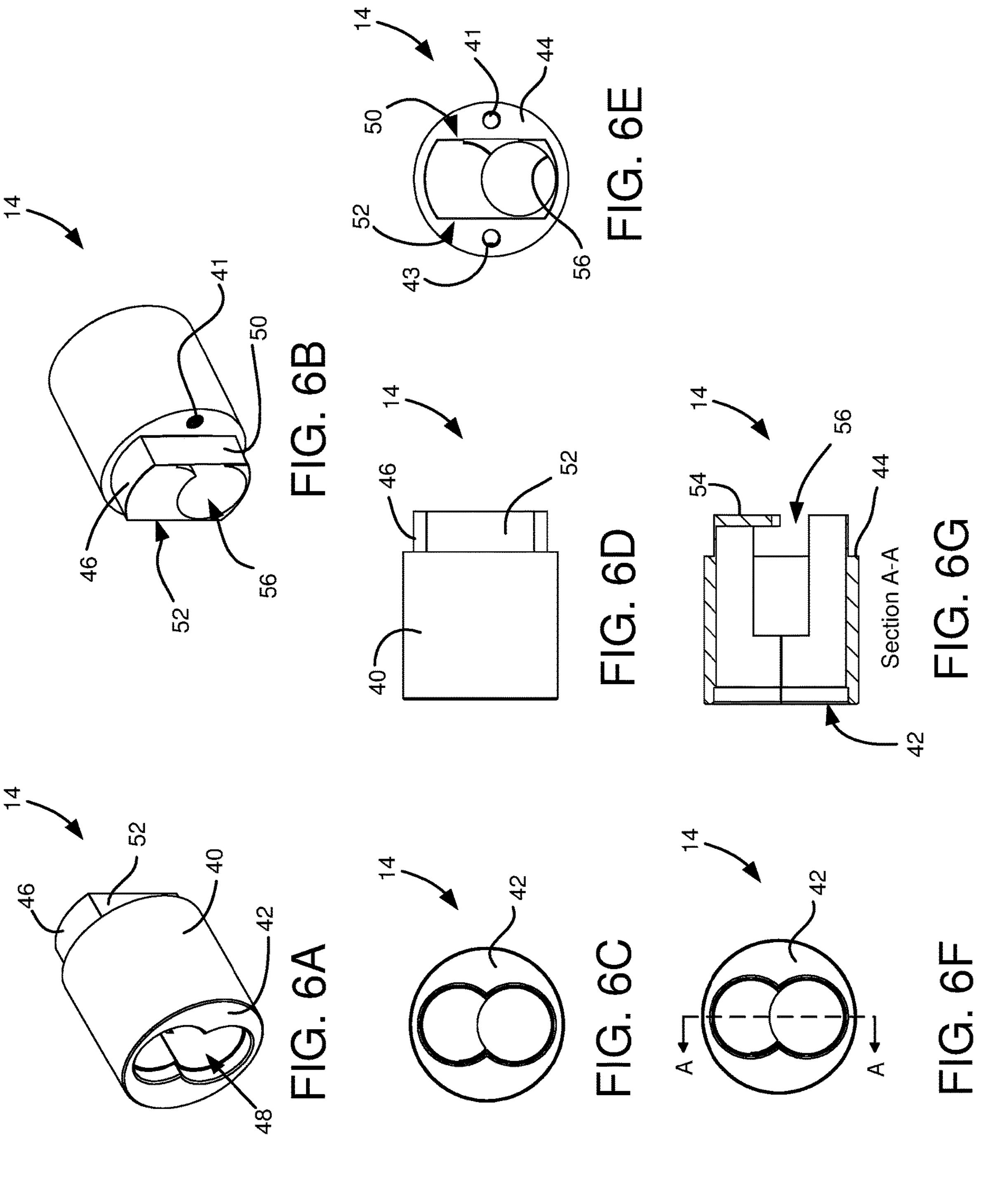
FIGS. 6A-6G illustrate various views of a barrel in accordance with an embodiment of the present disclosure.

FIGS. 6A-6G illustrate barrel 14, where FIG. 6A is a front perspective view, FIG. 6B is a rear perspective view, FIG. 6C is a front view, FIG. 6D is a side view, FIG. 6E is a rear view, FIG. 6F is another front view and FIG. 6G is a cross section taken along line A-A of FIG. 6F. Barrel 14 includes a cylindrical portion 40 having a front face 42 and a rear face 44. An extension portion 46 extends from the rear face 44 of the cylindrical portion 40. The front face 42 includes an aperture 48 configured to receive a locking actuation member 12, e.g., a core. The extension member 46 is generally circular with two flat surfaces 50, 52. The extension member 46 is configured in such a shape to be inserted into a correspondingly-shaped aperture of housing 16, as will be described below. A rear surface 54 of extension member 46 includes an aperture 56 configured to receive a portion of driver 18, as will be described below.

Figure 7A:
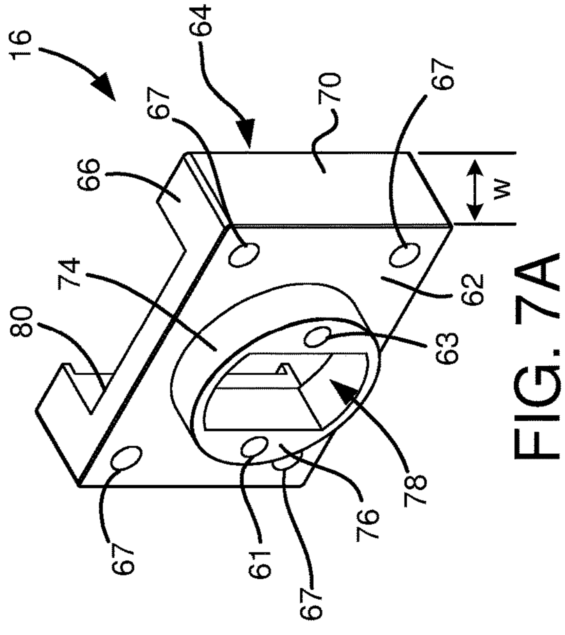
FIGS. 7A-7E illustrate various views of a housing in accordance with an embodiment of the present disclosure.
Figure 7B:
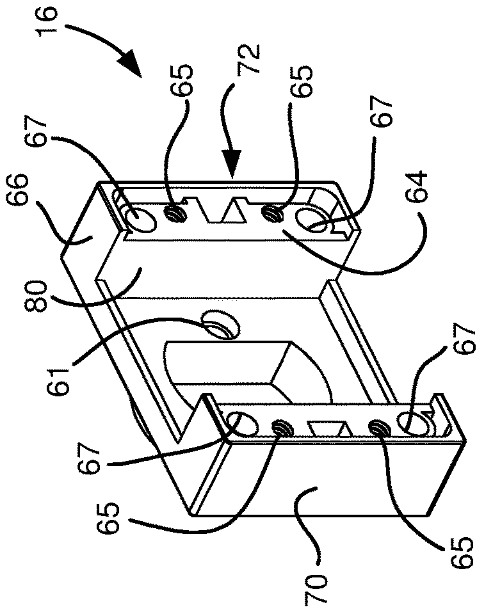
Figure 7C:
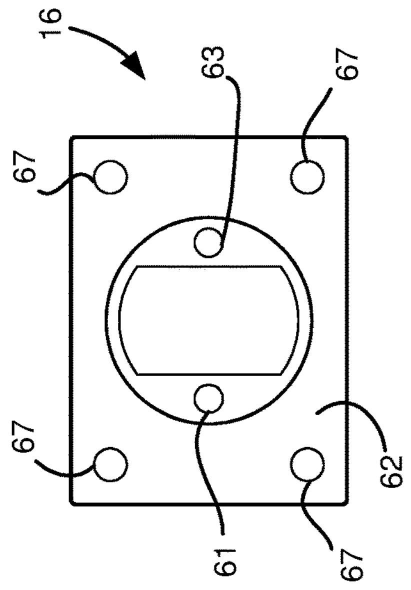
Figure 7D:
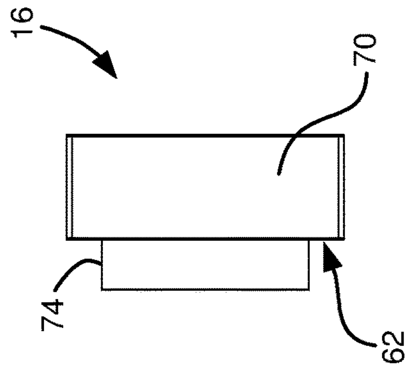
Figure 7E:
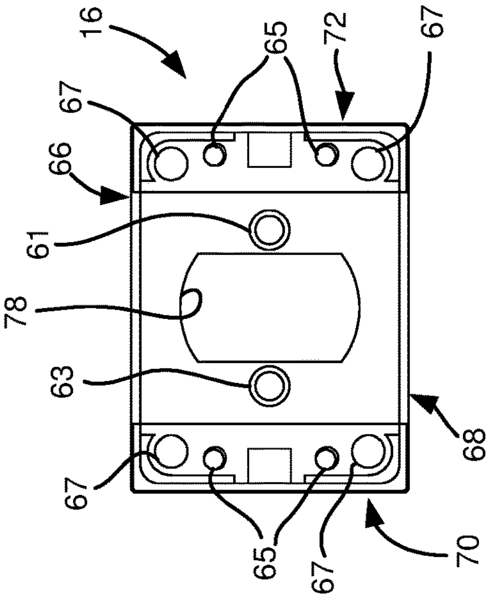

FIGS. 7A-7E illustrate housing 16, where FIG. 7A is a front perspective view, FIG. 7B is a rear perspective view, FIG. 7C is a front view, FIG. 7D is a side view and FIG. 7E is a rear view. The housing 16 is generally rectangular and includes a front face 62 and a rear face 64 face separated by a predetermined width w. The housing 16 further includes a top wall 66, bottom wall 68 and side walls 70, 72. A cylindrical member 74 extends from the front face 62 of the housing 16. The cylindrical member 74 includes a front face 76 which further includes aperture 78. It is to be appreciated that aperture 78 is configured in substantially the same shape (e.g., a complementary shape) as the extension member 46 of barrel 14 to receive the extension member 46. Additionally, the cylindrical member 74 is substantially the same shape as the cylindrical portion 40 of barrel 14 such that when extension member 46 is inserted into aperture 78, the cylindrical portion 40 and cylindrical member 74 appears to be continuous. Furthermore, rear surface 64 of housing 16 includes a recess 80 to accommodate top bolt 20 and bottom bolt 24 such that the first and second bolts 20, 24 extend from the housing 16 in a first position and at least partially retract within the housing 16 in a second position, as will be described below.

It is to be appreciated that barrel 14 is secured to the housing 16 via screws 32. Referring to FIGS. 6B and 6E, the rear face 44 of barrel 14 includes threaded apertures 41, 43. Similarly, the front face 76 of cylindrical member 74 includes apertures 61, 63. When extension member 46 is inserted into aperture 78, apertures 41, 43 align with apertures 61, 63 such that screws 32 may be inserted through apertures 61, 63 via the rear surface 64 of the housing 16 to secure the barrel 14 to the housing 16. Additionally, the housing 16 is configured with apertures 67 to enable the housing 16 to be mounted to a surface of a structure. For example, front face 62 may be placed against a surface of a structure, then, for example, at least one screw or fastener is disposed in aperture 67 through a rear face 64 of the housing 16 to secure the housing 16 to the structure.

Figure 8A:
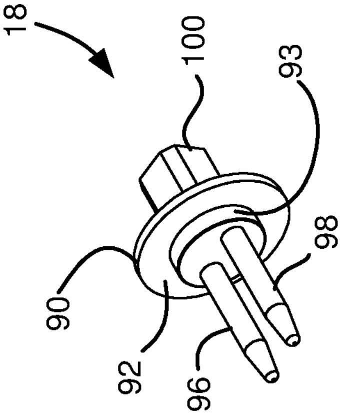
FIGS. 8A-8E illustrate various views of a driver in accordance with an embodiment of the present disclosure.
Figure 8B:
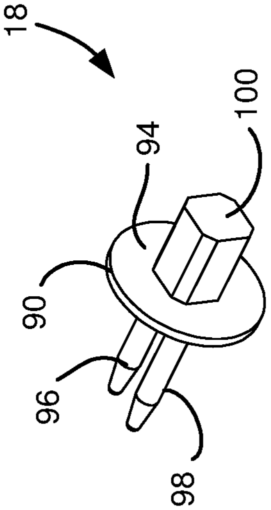
Figure 8C:
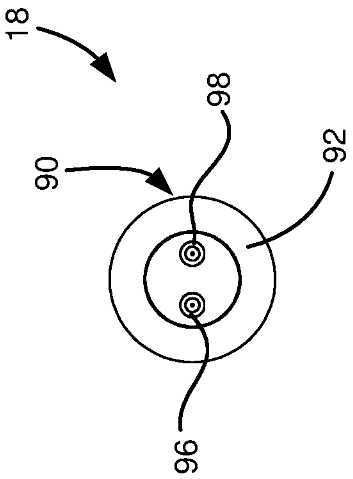
Figure 8D:
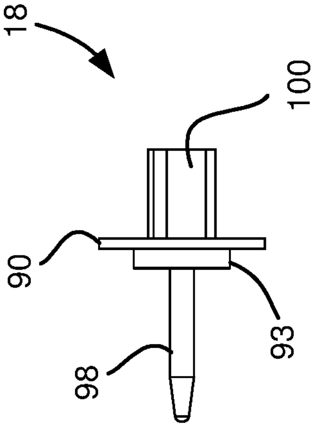
Figure 8E:
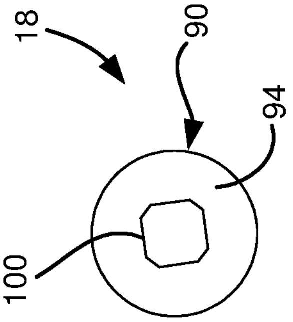

FIGS. 8A-8E illustrate driver 18, where FIG. 8A is a front perspective view, FIG. 8B is a rear perspective view, FIG. 8C is a front view, FIG. 8D is a side view and FIG. 8E is a rear view. Driver 18 includes a circular plate or disc 90 having a first surface 92 and a second surface 94. The first surface 92 of the disc 90 includes a first prong 96 and a second prong 98 extending perpendicularly from the first surface 92. The first surface 92 also includes a circular offset 93. Second surface 94 includes a generally square cam 100. Cam 100 is configured to interact with gear 22 to move bolts 20, 24 into a locked or unlocked position. It is to be appreciated that cam 100 may take other shapes, for example, octagonal, triangular, etc. and still contemplated to be within the scope of the present disclosure.

Referring again to FIG. 4, channels 11, 13 of SFIC or core 12 are configured to receive prongs 96 and 98 of driver 18 to couple driver 18 to core 12. Prongs 96, 98 are to be inserted through aperture 56 of barrel 14, until the first surface 92 comes into contact with the extension member 46. It is to be appreciated that offset 93 is dimensioned slightly smaller than aperture 56 such that the offset 93 enters the aperture 56 of extension member 46 until first surface 92 comes into contact with surface 54 of extension member 46.

It is to be appreciated that the manner in which driver is actuated may vary for other core types of fixed cylinder, i.e., other locking actuation members. In one embodiment, the driver may be part of the keyed cylinder or an actuating knob.

Figure 9A:
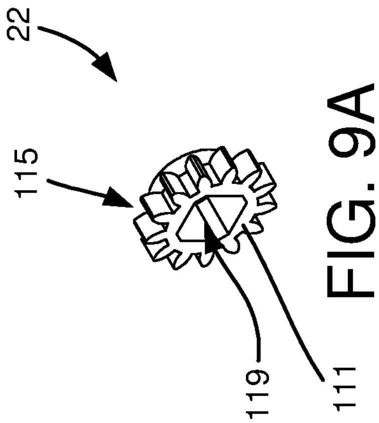
FIGS. 9A-9E illustrate various views of a gear in accordance with an embodiment of the present disclosure.
Figure 9B:
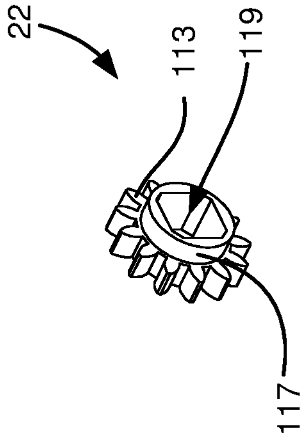
Figure 9C:
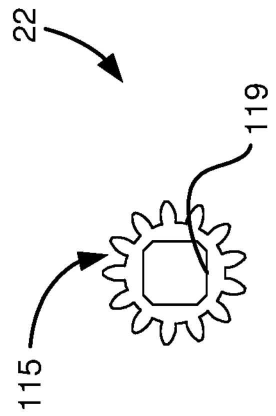
Figure 9D:
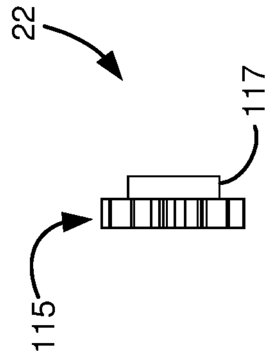
Figure 9E:
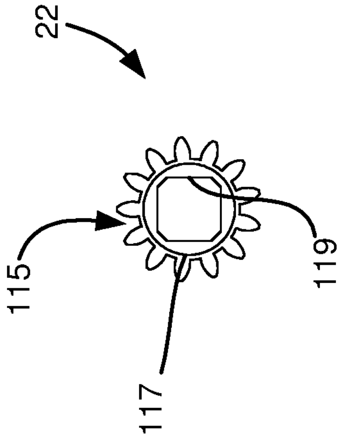

FIGS. 9A-9E illustrate a round cog gear 22, where FIG. 9A is a front perspective view, FIG. 9B is a rear perspective view, FIG. 9C is a front view, FIG. 9D is a side view and FIG. 9E is a rear view. Gear 22 includes a first surface 111, a second surface 113 and a plurality of teeth 115 around the periphery. The second surface 113 includes an circular offset 117 that extends away from the second surface 113. The gear 22 also includes an aperture 119 that is configured in a complementary shape to the cam 100 to receive the cam 100 therein, the operation of which will be described below.

Figure 10B:
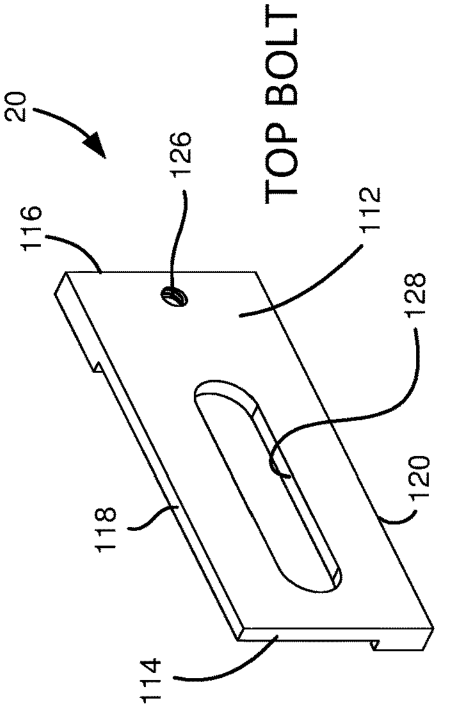
FIGS. 10A-10E illustrate various views of a top bolt in accordance with an embodiment of the present disclosure.
Figure 10A:
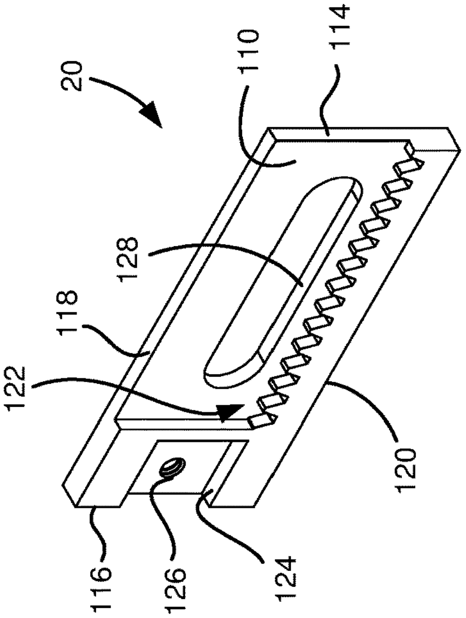
Figure 10E:
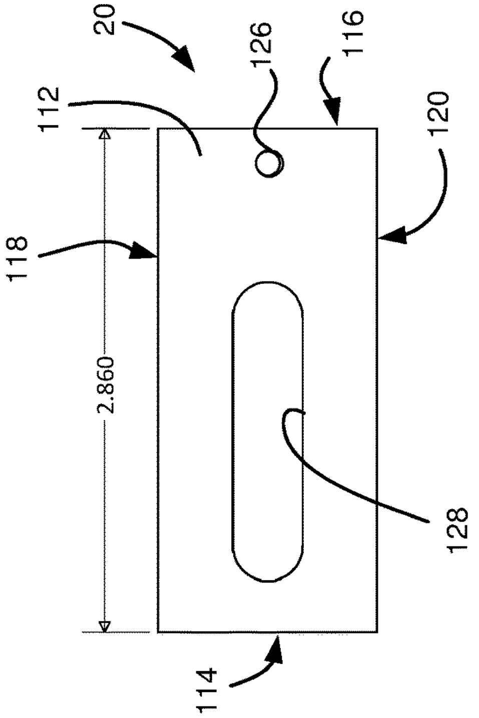
Figure 10D:
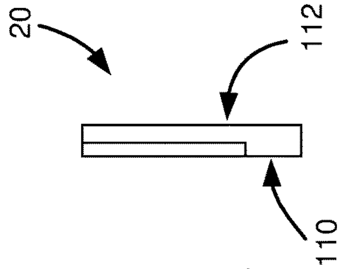
Figure 10C:
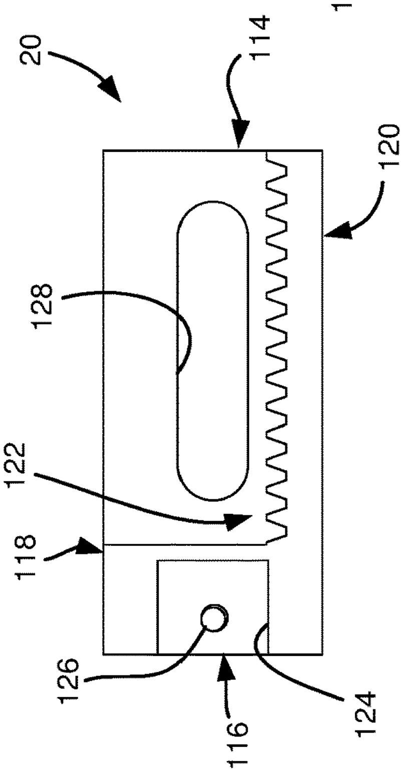

FIGS. 10A-10E illustrate a top bolt 20, where FIG. 10A is a front perspective view, FIG. 10B is a rear perspective view, FIG. 10C is a front view, FIG. 10D is a side view and FIG. 10E is a rear view. Top bolt 20 is generally rectangular and includes a first surface 110 and a second surface 112. The top bolt 20 further includes a first side edge 114 and a second side edge 116 opposite the first side edge 114, a third side edge 118 and a fourth side edge 120 opposite the third side edge 118. The top bolt 20 includes a plurality of gear teeth 122 formed parallel to the first surface 110 and adjacent the fourth edge 120. The plurality of gear teeth 122 runs from the first side edge 114 to a predetermined distance from the second side edge 116. At the second side edge 116, a recess 124 is formed and configured to receive an extension bar or member, as will be described in detail below. The recess 124 further includes an aperture 126 for receiving a fastener, such as a screw to secure the extension bar. It is to be appreciated that the recess 124 is configured in a complementary shape relative to the portion of the extension member to be disposed in the recess 124. Additionally, the top bolt 20 includes an elongated rounded slot 128 that is configured to enable the cam 100 of the driver 18 to slidingly ride therein.

Figures 11A, 11B, 11C, 11D, 11E:
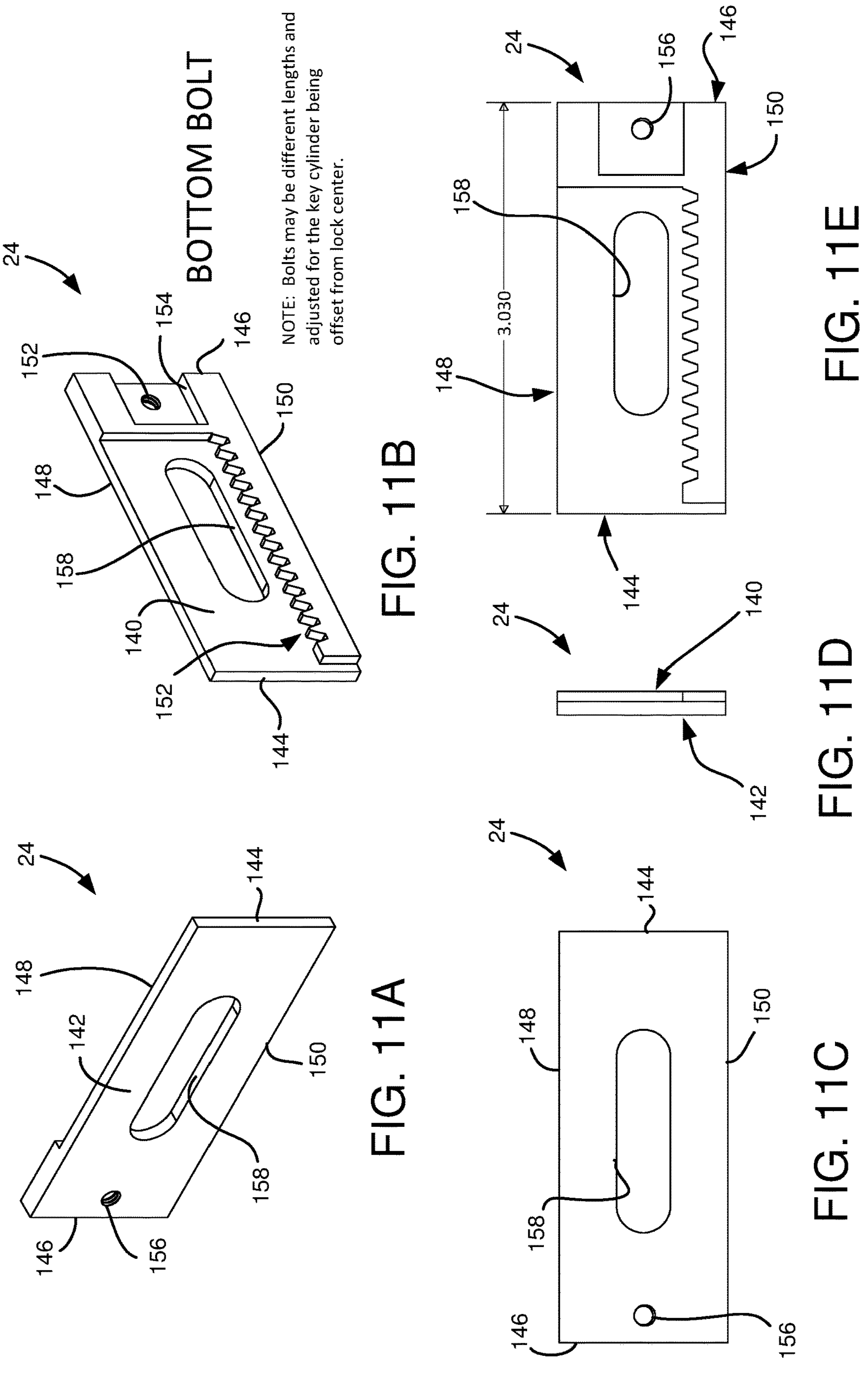
FIGS. 11A-11E illustrate various views of a bottom bolt in accordance with an embodiment of the present disclosure.

FIGS. 11A-11E illustrate bottom bolt 24, where FIG. 11A is a front perspective view, FIG. 11B is a rear perspective view, FIG. 11C is a front view, FIG. 11D is a side view and FIG. 11E is a rear view. Bottom bolt 24 is generally rectangular and includes a first surface 140 and a second surface 142. The bottom bolt 24 further includes a first side edge 144 and a second side edge 146 opposite the first side edge 144, a third side edge 148 and a fourth side edge 150 opposite the third side edge 158. The bottom bolt 24 includes a plurality of gear teeth 152 formed parallel to the first surface 140 and adjacent the fourth edge 150. The plurality of gear teeth 152 runs from the first side edge 144 to a predetermined distance from the second side edge 146. At the second side edge 146, a recess 154 is formed and configured to receive an extension bar or member, as will be described in detail below. The recess 154 further includes an aperture 156 for receiving a fastener, such as a screw to secure the extension bar. It is to be appreciated that the recess 154 is configured in a complementary shape relative to the portion of the extension member to be disposed in the recess 154. Additionally, the bottom bolt 24 includes an elongated rounded slot 158 that is configured to enable the cam 100 of the driver 18 to slidingly ride therein.

It is to be appreciated that the plurality of gear teeth 122, 152 are configured on a respective surface 110, 140 of bolts 20, 24 on opposite sides 120, 150 such that when surfaces 110, 140 are arranged in a parallel relationship facing each other, the gear 22 will engage the gear teeth 122, 152 to drive the bolts 20, 24.

Figures 12A, 12B, 12C, 12D, 12E:
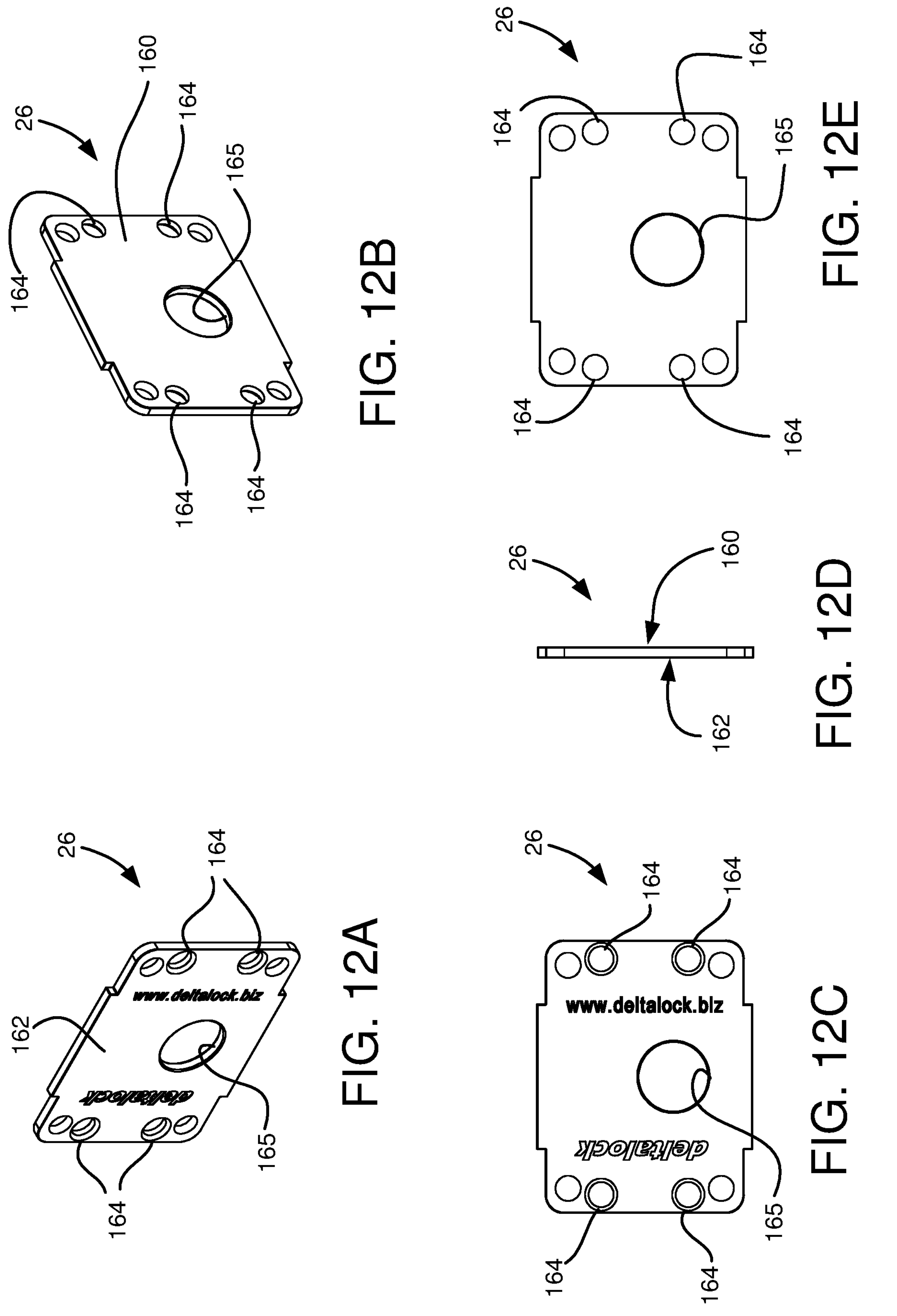
FIGS. 12A-12E illustrate various views of an end plate in accordance with an embodiment of the present disclosure.

FIGS. 12A-12E illustrate end plate 26, where FIG. 12A is a front perspective view, FIG. 12B is a rear perspective view, FIG. 12C is a front view, FIG. 12D is a side view and FIG. 12E is a rear view. End plate 26 includes a first surface 160 and second surface 162. The end plate 26 includes a plurality of apertures 164 that are configured on the end plate 26 to align with apertures 65 disposed on the rear surface 64 of housing 16. When the end plate 26 is disposed on the rear surface 64 of housing 16, screws 30 may be disposed through apertures 164 to secure the end plate 26 to the housing 16. Additionally, end plate 26 includes aperture 165 configured to receive the cam 100 of driver 18 when the end plate 26 is coupled to the housing 16.

The assembling of the drawer lock 10 will now be described. The extension member 46 of barrel 14 is inserted into aperture 78 of housing 16. Apertures 41, 43 of barrel 14 align with apertures 61, 63 of housing 16 such that screws 32 may be inserted through apertures 61, 63 via the rear surface 64 of the housing 16 to secure the barrel 14 to the housing 16. Core 12 is disposed in aperture 48 of barrel 14. A master or control key (different than the key used to lock and unlock the drawer lock 10) is inserted into keyhole 8 of core 12 and rotated such that an engaging element (not shown) of the core 12 engages a portion of the interior of barrel 14 to secure the core 12 to the barrel 14. Prongs 96, 98 of driver 18 are inserted through aperture 56 of barrel 14, until the first surface 92 of disc 90 comes into contact with the extension member 46. Next, top bolt 20 is disposed in recess 80 of housing 16 such that cam 100 of driver 19 is disposed in the elongated slot 128 of top bolt 20. Gear 22 is then disposed over cam 100 of gear 22 such that at least a portion of the teeth 115 of gear 22 interacts with a portion of the gear teeth 122 of top bolt 20.

Next, bottom bolt 24 is disposed in recess 80 of housing 16 such that cam 100 of driver 18 is disposed in the elongated slot 158 of bottom bolt 24. It is to be appreciated that at least a portion of the teeth 115 of gear 22 interacts with a portion of the gear teeth 152 of bottom bolt 22. The first and second bolts 20, 24 are arranged in the housing 16 in a parallel relationship such that the first plurality of gear teeth 122 are spaced a predetermined distance away from the second plurality of gear teeth 152 and the gear is disposed between the first and second bolt 20, 24 and configured to engage the first and second plurality of gear teeth 122, 152. When the driver 18 is actuated, the cam 100 is subsequently rotated which causes the gear 22 to rotate and drive the bolts 20, 24 in opposite directions relative to each other.

Lastly, the end plate 26 is disposed on the rear surface 64 of housing 16 and screws 30 are be disposed through apertures 164 to secure the end plate 26 to the housing 16. The cam 100 of driver 18 is disposed through the aperture 165 of the end plate 26 such that when the lock 10 is assembled the cam 100 extends from the driver 18 through the slot 128 of bolt 20, aperture 119 of gear 22, slot 158 of bolt 24 and aperture 165 of end plate 26.

Figure 13A:
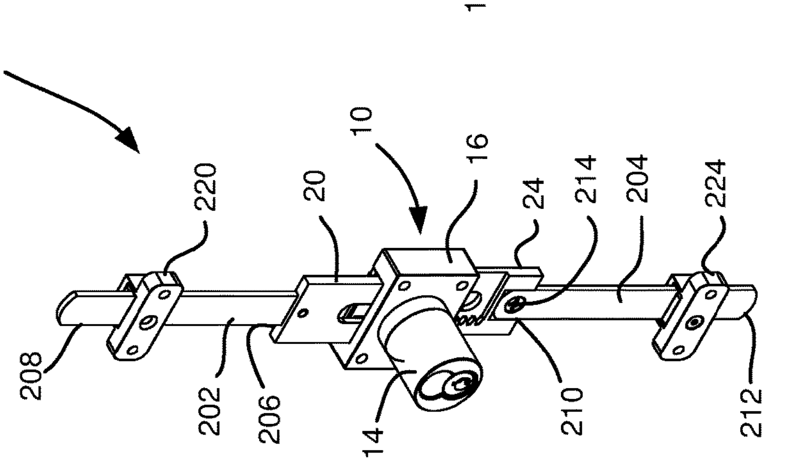
FIG. 13A is a front, perspective view of a drawer lock assembly in a locked position
Figure 13B:
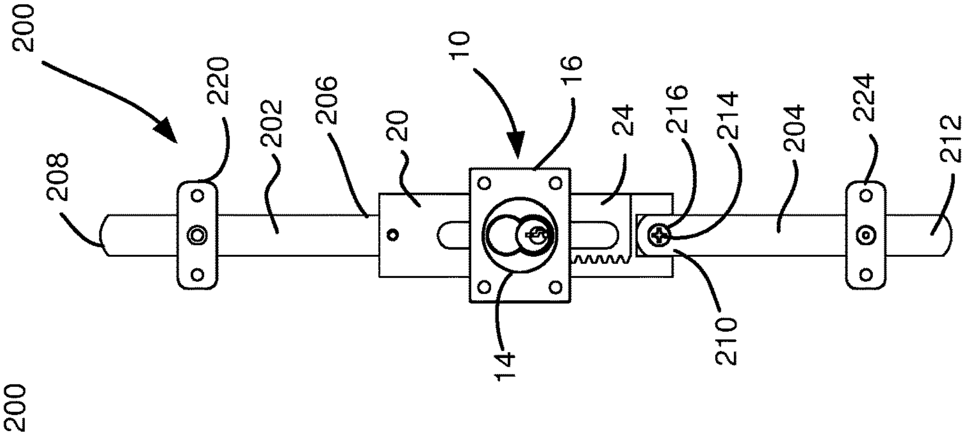
FIG. 13B is a front view of a drawer lock assembly in a locked position in accordance with an embodiment of the present disclosure.
Figure 13C:
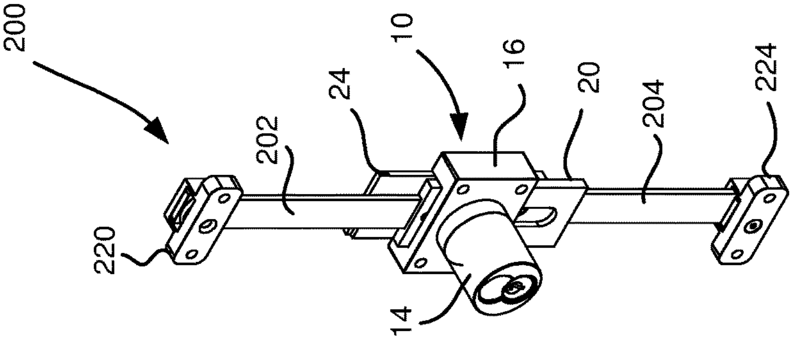
FIG. 13C is a front, perspective view of a drawer lock assembly in an open position
Figure 13D:
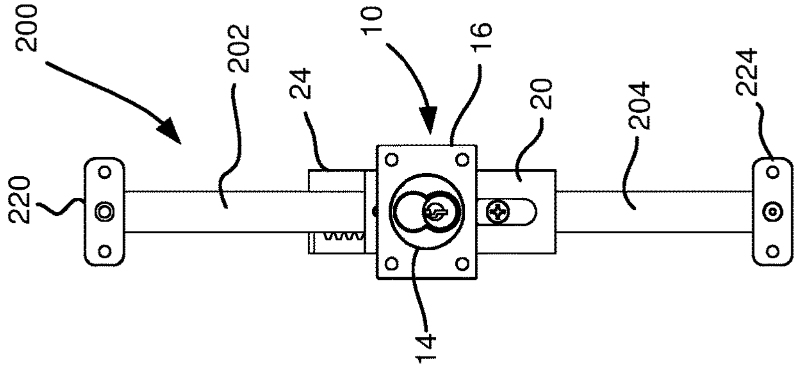
FIG. 13D is a front view of a drawer lock assembly in an open position in accordance with an embodiment of the present disclosure.

Referring to FIGS. 13A-13D, a drawer lock assembly 200 is illustrated in the locked position (i.e., the bolts 20, 24 are extended from the housing 16) in FIGS. 13A and 13B and in the open position (i.e., the bolts 20, 24 are at least partially retracted into the housing 16) in FIGS. 13C and 13D. The drawer lock assembly 200 includes drawer lock 10, a first extension bar 202 coupled to top bolt 20 and a second extension bar 204 coupled to bottom bolt 24. As described above, top bolt 20 includes a recess 124 which is configured to receive a first end 206 of first extension member 202. A fastener (not shown) is disposed through an aperture (not shown) in the first end 206 of first extension member 202 to secure the extension member 202 to the top bolt 20. Bottom bolt 24 includes a recess 154 which is configured to receive a first end 212 of second extension member 204. A fastener 214 is disposed through an aperture 216 in the first end 210 of second extension member 204 to secure the extension member 204 to the bottom bolt 24.

Figures 14A, 14B, 14C, 14D, 14E, 14F:
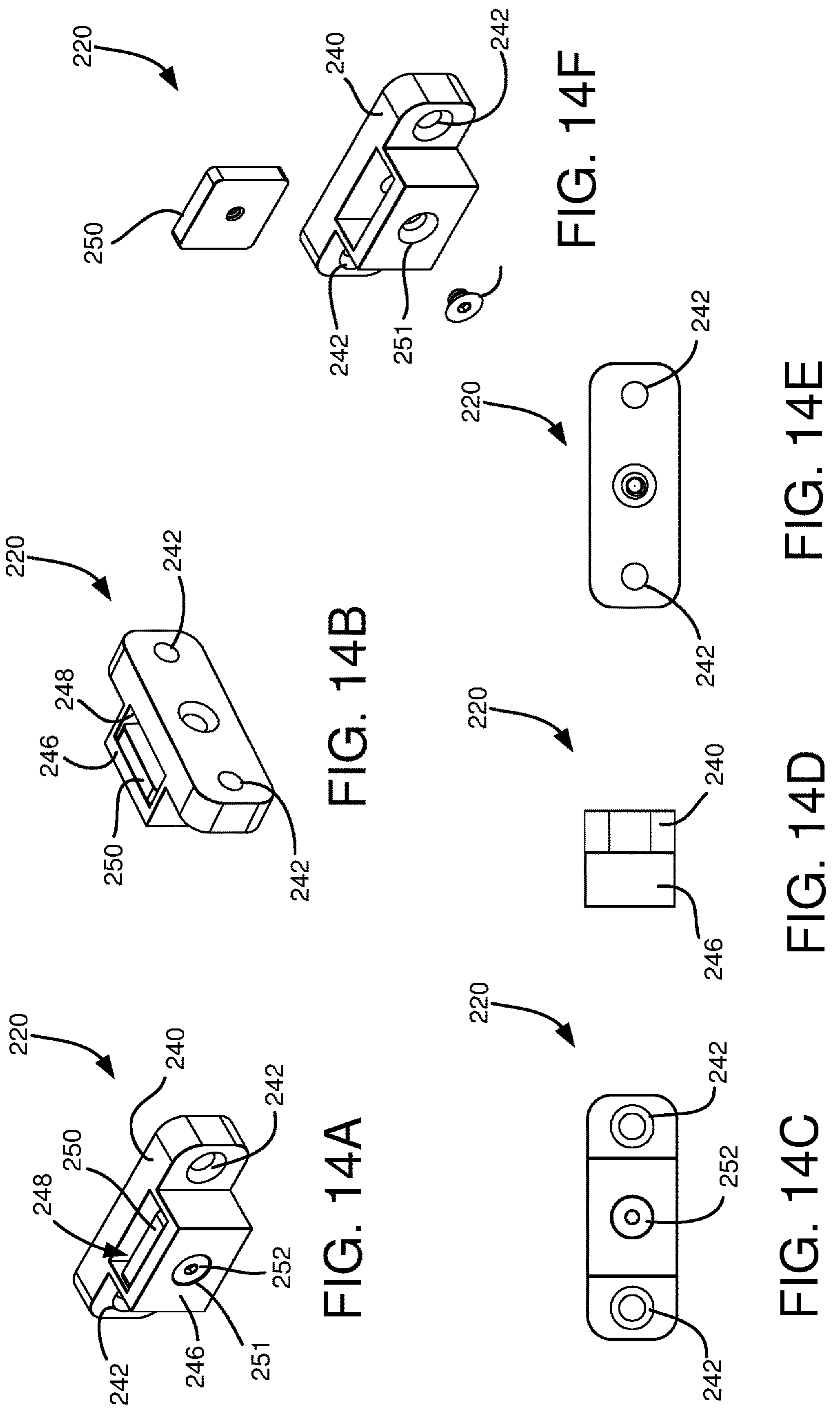
FIGS. 14A-14F illustrate various views of a bar guide in accordance with an embodiment of the present disclosure.

The drawer lock assembly 200 further includes a first bar guide 220 and a second guide bar 224 for receiving respective second ends 208, 212 of extension members 202, 204 to enable the second ends 208, 212 to slide therethrough. Referring to FIGS. 14A-F, a bar guide 220 is illustrated, where FIG. 14A is a front perspective view, FIG. 14B is a rear perspective view, FIG. 14C is a front view, FIG. 14D is a side view, FIG. 14E is a rear view and FIG. 14F is an exploded view. Bar guide 220 includes a first rectangular member 240. The first rectangular member 240 includes two apertures 242 to enable the bar guide 240 to be mounted to a structure where the drawer lock assembly 200 is to be employed. The bar guide 220 includes a receiving member 246 coupled to the member 240 configured to slidingly receive first end 208 of first extension member 202. The receiving member 246 includes a slot 248 for slidingly receiving the first end 208 of first extension member 202. A repositionable spacer 250 is provided to account for the offset of the extension bars created by the top and bottom bolts. As shown in FIGS. 14A-F, the repositionable spacer 250 is mounted in a first position in the receiving member 246 via aperture 251 and fastener 252. In this manner, bar guide 220 is configured to receive first extension bar 202.

Figure 15A:
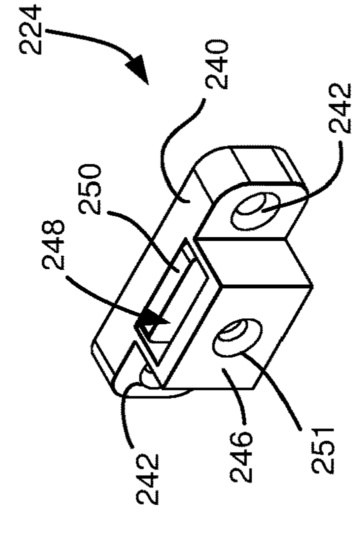
FIGS. 15A-15F illustrate various views of a bar guide in accordance with another embodiment of the present disclosure.
Figure 15B:
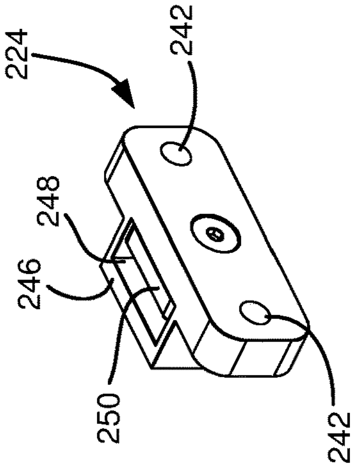
Figure 15F:
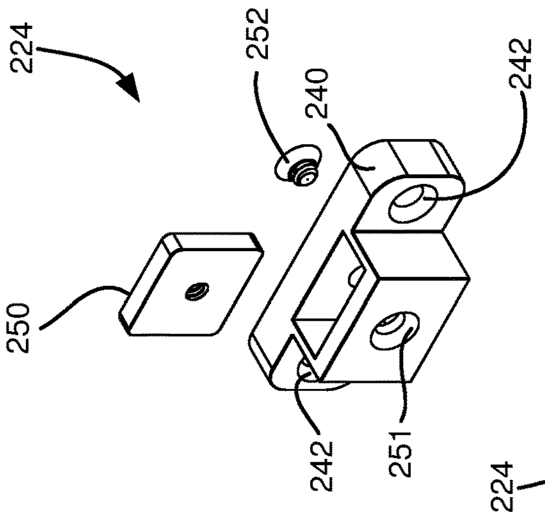
Figure 15C:
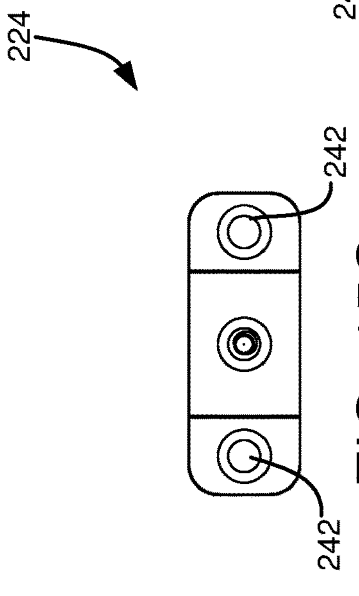
Figure 15D:
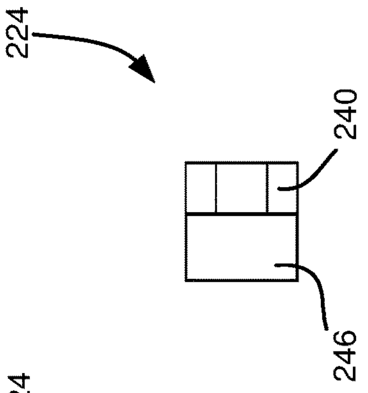
Figure 15E:
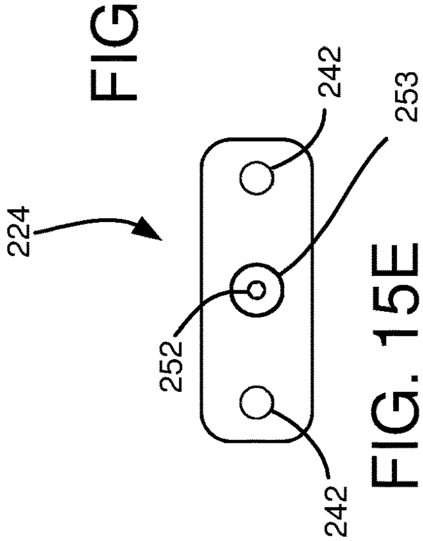

Referring to FIGS. 15A-F, a bar guide 224 is configured to receive the second extension bar 204, where FIG. 15A is a front perspective view, FIG. 15B is a rear perspective view, FIG. 15C is a front view, FIG. 15D is a side view, FIG. 15E is a rear view and FIG. 15F is an exploded view. In FIG. 15A-15F, the bar guide 224 includes the same components as bar guide 220; however, in this embodiment, the repositionable space 250 is mounted in a second position in the receiving member 246 via aperture 253 and fastener 252. In this manner, bar guide 224 is configured to slidingly receive second extension bar 204.

Referring to FIGS. 13A-13D, the operation of the drawer lock assembly 200 will be described. FIGS. 13A and 13B illustrate the drawer lock assembly 200 in the locked position, i.e., the top bolt 20 and bottom bolt 24 have been actuated and extension bars 202, 204 are disposed in a recess (not shown) of a structure, e.g., a cabinet, desk, etc. Upon an appropriate key being inserted into keyhole 8, the key may be rotated to open the drawer lock 10. The rotation of core 12 will cause driver 18 to rotate. Due to the rotation of driver 18, cam 10, disposed in gear 22, will cause top bolt 20 to move in a downward direction in recess 80 of housing 16 and bottom bolt 24 to move in an upward direction in recess 80 of housing 16. The movement of top bolt 20 will cause the corresponding movement of extension bar 202 within bar guide 220 and movement of bottom bolt 24 will cause the corresponding movement of extension bar 204 with bar guide 224. In this manner, the extension bars 202, 204 will no longer being disposed in the recesses of the structure allowing the drawer the locking device is mounted on to be opened.

Figure 16A:
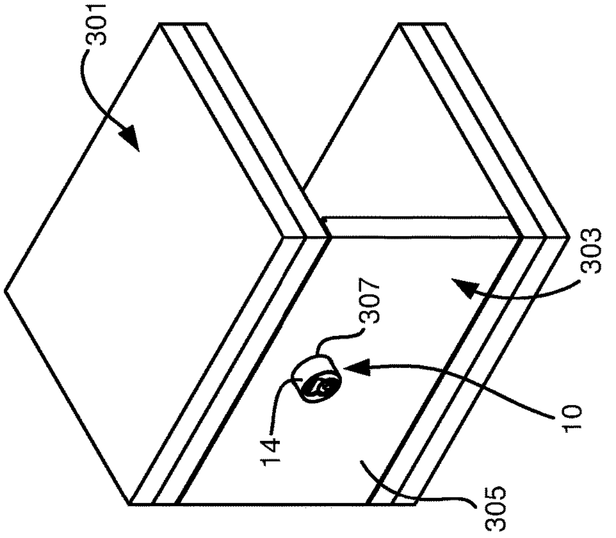
FIG. 16A is a front, perspective view of a structure including a drawer lock assembly in accordance with an embodiment of the present disclosure.
Figure 16B:
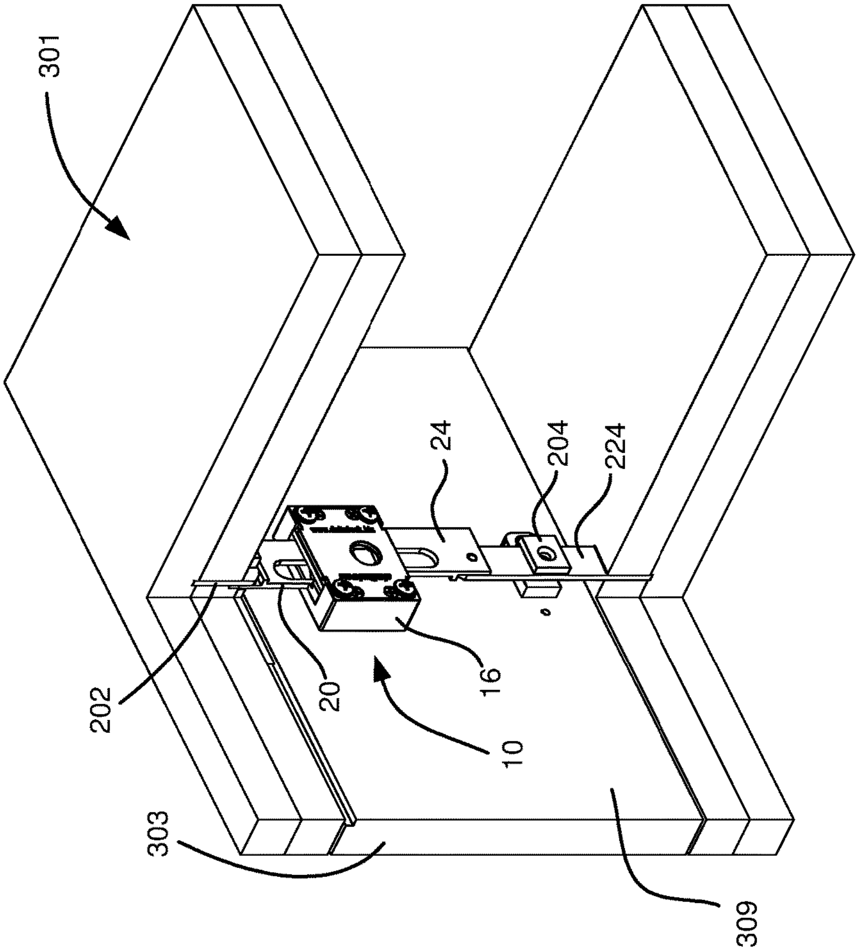
FIG. 16B is a rear, perspective view of the structure shown in FIG. 16A with a portion cut-away in accordance with an embodiment of the present disclosure.

Referring to FIGS. 16A-16D, the operation of the drawer lock assembly 200 will be described in relation the operation of a drawer of a structure, e.g., a file cabinet, desk, etc. FIG. 16A illustrates a structure 301 having a drawer 303 (e.g., a movable portion of the structure) with a lock assembly 200 of the present disclosure mounted or coupled to the drawer and FIG. 16B illustrates the structure 301 having a cutaway view. Referring to FIG. 16A, the barrel 14 of lock 10 extends through the drawer 303 when the drawer 303 is a closed position and therefore, keyhole 8 is accessible to operate the lock assembly 200. As shown in FIG. 16B, barrel 14 is disposed through aperture 307 of front face 305 of drawer 303. The front face 62 of housing 16 is in contact with a rear surface 309 of drawer 303. Screws (or other fasteners) may be disposed through apertures 67 of the housing 16 to secure the lock 10 to the rear surface 309 of the drawer 303, i.e., at least one end of the screws will engage the rear surface 309 of the drawer 303.

Figure 16D:
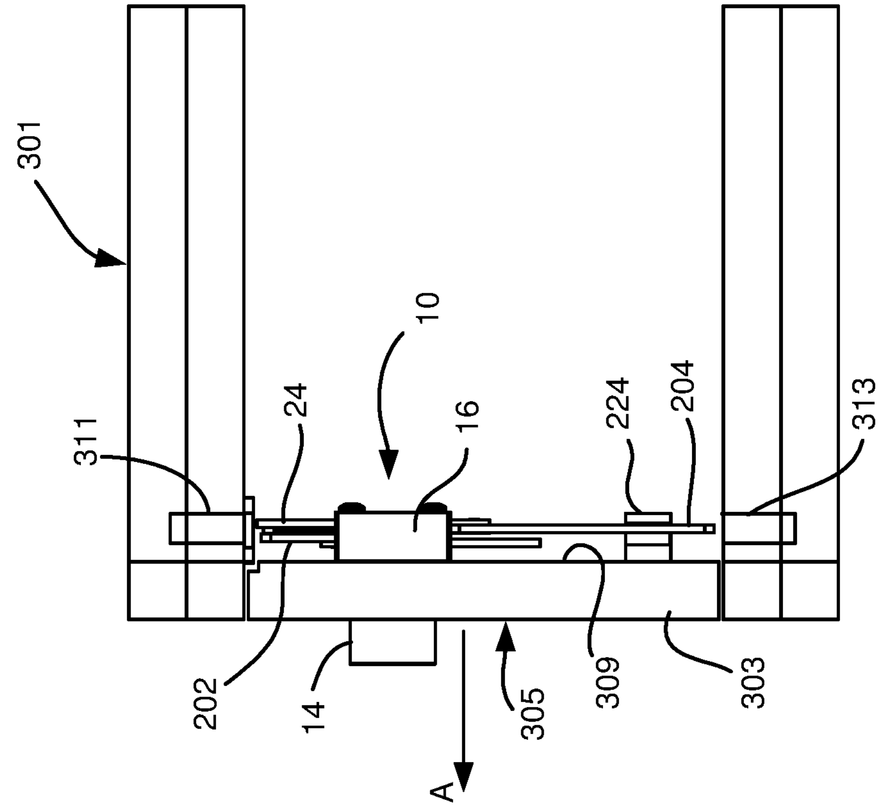
FIG. 16C is a cross-sectional view of a structure including a drawer lock assembly with the drawer lock assembly in a locked or extended position in accordance with an embodiment of the present disclosure.
Figure 16C:
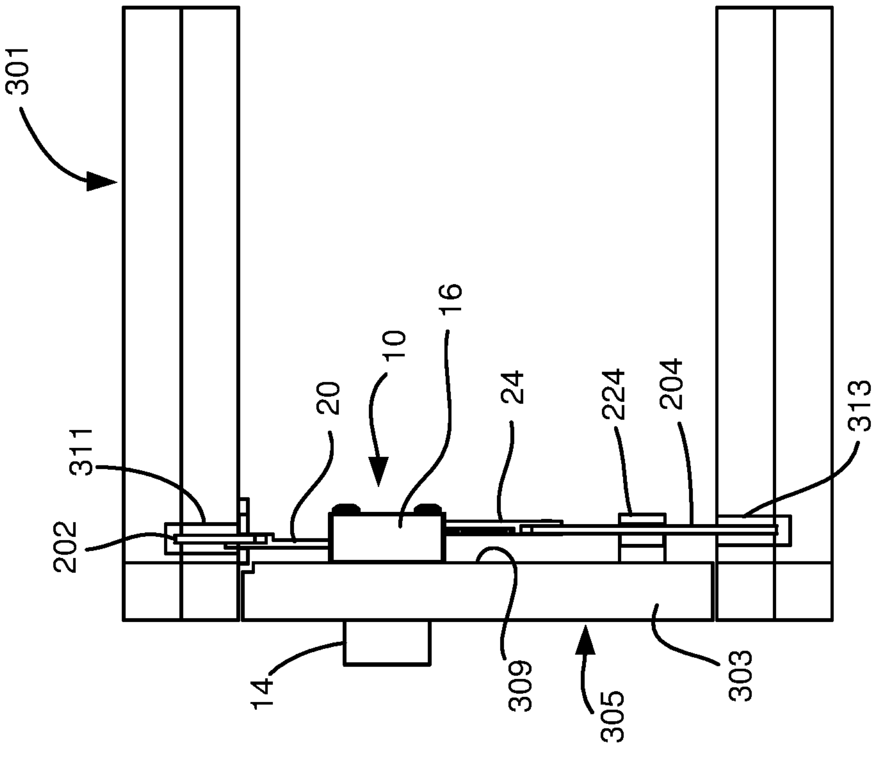

FIGS. 16B and 16C illustrate the drawer lock assembly 200 in a locked or extended state (i.e., a first position) when the drawer 303 cannot be opened relative to the structure 301. As shown in FIG. 16C, the bolts 20, 24 are in a vertical extended position, where the extension members 202, 204 coupled to the respective bolts enter into recesses 311, 313 of the structure 301. In this manner, the drawer 303 cannot be moved relative to the structure, i.e., the drawer is locked.

It is to be appreciated that in other embodiment, the extension members 202, 204 may be omitted and the bolts 20, 24 may enter the recesses 311, 313 to lock the drawer 303.

FIG. 16D illustrates the drawer lock assembly 200 in open or retracted state (i.e., a second position) when the drawer 303 can be opened relative to the structure 301. As shown in FIG. 16D, the bolts 20, 24 are retracted into housing 16, where the extension members 202, 204 coupled to the respective bolts are withdrawn from the recesses 311, 313 of the structure 301. In this manner, the drawer 303 can be moved relative to the structure, for example, in the direction of arrow A, to open the drawer 303.

It is to be appreciated that the housing and barrel of the locking device of the present disclosure may take many forms and shapes and still will remain with the scope of the present disclosure. For example, the barrel may be an oval barrel 14A as shown in FIG. 17, a faceted barrel 148 as shown in FIG. 18, a faceted-round barrel, a rectangular barrel 14C as shown in FIG. 19 and/or a round barrel. The housing may be a square housing, round housing, faceted housing 16A as shown in FIG. 20 and/or an oval housing. It is further to be appreciated that the shapes of the barrel and housing may be of any combination and not just the embodiment shown and described in the present disclosure.

It is to be appreciated that the housing and barrel of the present disclosure may take many forms and shapes and is not to be limited to the embodiments shown herein.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure. For example, while a key removable core and SFIC core have been shown and described, it is to be appreciated that the present disclosure contemplates using other various types of locking actuation member such as cores and/or cylinders including, but not limited to, large format interchangeable cores, full size interchangeable cores, a fixed cylinder, etc. It is further to be appreciated that the housings and drivers in accordance with the spirit of the present disclosure may be modified to incorporate future or to-be-invented cores and/or cylinders. In addition to cores and/or cylinders, the present disclosure contemplates that the housings and drivers in accordance with the spirit of the present disclosure may be modified to incorporate future or to-be-invented locking actuation members that function similarly to cores and/or cylinders.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A drawer lock assembly comprising:

a housing having a front face and a rear face separated by a predetermined width;

a barrel having a first end extending perpendicularly from the front face of the housing and a second end extending to the rear face of the housing;

a locking actuation member disposed through the first end of the barrel;

a driver disposed through the second end of the barrel to engage the locking actuation member;

a first and second bolt, each bolt configured to engage the driver, where upon actuation of the driver via the locking actuation member, the first and second bolts move in opposite directions of each other in a perpendicular arrangement relative to the barrel, each bolt is generally rectangular and includes a first surface and a second surface, the first bolt further includes a first plurality of gear teeth parallel to the first surface along a first edge and the second bolt includes a second plurality of gear teeth formed parallel to the first surface along and edge opposite the first edge of the first bolt; and an end plate configured to retain the driver and the first and second bolts in the housing, wherein upon actuation of the locking actuation member by a key, the first and second bolts extend from the housing in a first position and at least partially retract within the housing in a second position, wherein the first and second bolts are arranged in the housing in a parallel relationship such that the first plurality of gear teeth are spaced a predetermined distance away from the second plurality of gear teeth, and further comprising a round cog gear disposed between the first and second bolt and configured to engage the first and second plurality of gear teeth, wherein each of the first and second bolts include an elongated slot positioned adjacent the respective plurality of gear teeth and the driver includes a cam that extends through the elongated slots and an aperture in the gear, wherein upon actuation of the driver, the cam rotates the gear to extend and/or retract the first and second bolts.

2. The drawer lock assembly of claim 1, further comprising a first extension member coupled to the first bolt and a second extension member coupled to the second bolt.

3. The drawer lock assembly of claim 2, further comprising a first guide member that slidingly receives a free end of the first extension member and a second guide member that slidingly receives a free end of the second extension member.

4. A drawer lock assembly comprising:

a housing having a front face and a rear face separated by a predetermined width;

a barrel having a first end extending perpendicularly from the front face of the housing and a second end extending to the rear face of the housing;

a locking actuation member disposed through the first end of the barrel;

a driver disposed through the second end of the barrel to engage the locking actuation member;

a first and second bolt, each bolt configured to engage the driver, where upon actuation of the driver via the locking actuation member, the first and second bolts move in opposite directions of each other in a perpendicular arrangement relative to the barrel;

an end plate configured to retain the driver and the first and second bolts in the housing, a first extension member coupled to the first bolt and a second extension member coupled to the second bolt; and a first guide member that slidingly receives a free end of the first extension member and a second guide member that slidingly receives a free end of the second extension member, wherein upon actuation of the locking actuation member by a key, the first and second bolts extend from the housing in a first position and at least partially retract within the housing in a second position, wherein each guide member includes a receiving member that slidingly receives the free end of the respective extension member, each guide member further includes a repositionable spacer disposed in the receiving member to compensate for a position of the respective extension member.

5. The drawer lock assembly of claim 4, wherein each of the first and second bolts include a plurality of gear teeth and a round cog gear is coupled to the driver to actuate the first and second bolts.

6. The drawer lock assembly of claim 1, wherein each of the first and second bolts include a recess configured to receive an extension member.

7. The drawer lock assembly of claim 1, wherein the end plate includes an aperture that receives the cam of the driver.

8. The drawer lock assembly of claim 1, wherein the rear face of the housing includes a recess configured to receive the first and second bolts such that the first and second bolts extend from the housing in the first position and at least partially retract within the housing in the second position.

9. The drawer lock assembly of claim 1, wherein the second end of the barrel includes an extension member configured in a predetermined shape and the front face of the housing includes an aperture configured in a complementary shape to receive the extension member of the barrel.

10. The drawer lock assembly of claim 1, wherein the driver includes a circular plate including a first surface and a second surface, the first surface includes first and second prongs that engage the locking actuation member and the second surface includes the cam.

11. The drawer lock assembly of claim 10, wherein the end plate includes an aperture that receives the cam of the driver.

12. The drawer lock assembly of claim 1, wherein the barrel is a cylindrical barrel.

13. The drawer lock assembly of claim 1, wherein the barrel is an oval barrel.

14. The drawer lock assembly of claim 1, wherein the barrel is a faceted barrel.

15. The drawer lock assembly of claim 1, wherein the barrel is a rectangular barrel.

16. The drawer lock assembly of claim 1, wherein the housing is at least one of a rectangular housing and a faceted housing.

17. The drawer lock assembly of claim 1, wherein the locking actuation member is at least one of a small format interchangeable core, a key removable core, a large format interchangeable core, a full-size interchangeable core and/or a fixed cylinder.

* * * * *